(12) United States Patent
Takenaka

(10) Patent No.: US 6,914,937 B2
(45) Date of Patent: Jul. 5, 2005

(54) IMAGE CONTROL APPARATUS

(75) Inventor: Yuuji Takenaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 635 days.

(21) Appl. No.: 09/812,789

(22) Filed: Mar. 15, 2001

(65) Prior Publication Data

US 2002/0037051 A1 Mar. 28, 2002

(30) Foreign Application Priority Data

Sep. 25, 2000 (JP) .................................. 2000-290015

(51) Int. Cl.⁷ ............................................. H04N 7/18
(52) U.S. Cl. ........................... 375/240.13; 375/240.15; 375/240.12
(58) Field of Search ..................... 375/240.11–240.17

(56) References Cited

U.S. PATENT DOCUMENTS

| 5,642,174 A | * | 6/1997 | Kazui et al. ............... 348/700 |
| 5,745,181 A | * | 4/1998 | Wilkinson ............. 375/240.15 |
| 5,859,668 A | * | 1/1999 | Aono et al. ............ 375/240.15 |
| 5,959,690 A | * | 9/1999 | Toebes et al. ............. 348/578 |
| 6,005,643 A | * | 12/1999 | Morimoto et al. ...... 375/240.26 |
| 6,393,200 B1 | * | 5/2002 | Van Den Enden ............ 386/68 |
| 6,549,578 B1 | * | 4/2003 | Maruya et al. ......... 375/240.23 |
| 6,608,866 B1 | * | 8/2003 | Saunders et al. ....... 375/240.16 |

FOREIGN PATENT DOCUMENTS

| JP | 09051538 A | 2/1997 |
| JP | 11275585 A | 10/1999 |

* cited by examiner

Primary Examiner—Andy Rao
(74) Attorney, Agent, or Firm—Staas & Halsey LLP

(57) ABSTRACT

An image control apparatus is capable of coding an image signal with increased efficiency for improved image quality. The image control apparatus has a comparison processing unit for carrying out at least one of a first comparison process to compare a motion vector with a threshold, a second comparison process to compare a motion-compensated predictive error with a threshold, and a third comparison process to compare a difference value produced by subtracting the motion-compensated predictive error from an interframe difference with a threshold, and a repetitive number control unit for adaptively controlling the number of repeated B pictures to be inserted into a stream based on the compared result of the comparison process which is carried out by the comparison processing unit.

12 Claims, 22 Drawing Sheets

T MATRIX TABLE

| MOTION VECTOR | MC PREDICTIVE ERROR | DIFFERENCE VALUE | OUTPUT | STATE |
|---|---|---|---|---|
| 0 (INCREASE) | 0 (INCREASE) | 0 | Inc | REGARDED AS STILL IMAGE |
| 0 (INCREASE) | 0 (INCREASE) | 1 (INCREASE) | Inc | MOTION VECTOR IS EFFECTIVE / MOTION VECTOR IS SMALL |
| 0 (INCREASE) | 1 | 0 | H | MOTION VECTOR IS NOT EFFECTIVE / MOTION VECTOR IS SMALL |
| 0 (INCREASE) | 1 | 1 (INCREASE) | Inc | MOTION VECTOR IS EFFECTIVE / MOTION VECTOR IS SMALL |
| 1 | 0 (INCREASE) | 0 | H | MOTION VECTOR IS LARGE, NOT EFFECTIVE / MC PREDICTIVE OR IS SMALL |
| 1 | 0 (INCREASE) | 1 (INCREASE) | Inc | MOTION VECTOR IS EFFECTIVE / MC PREDICTIVE ERROR IS SMALL |
| 1 | 1 | 0 | Dec | MOTION VECTOR IS NOT EFFECTIVE / MC PREDICTIVE ERROR IS LARGE |
| 1 | 1 | 1 (INCREASE) | H | MOTION VECTOR IS EFFECTIVE / MC PREDICTIVE ERROR IS LARGE |

1: GREATER THAN THRESHOLD
0: SMALLER THAN THRESHOLD
(INCREASE): THE NUMBER OF REPEATED B PICTURES IS INCREASED

FIG. 8

IMAGE CONTROL APPARATUS

BACKGROUND OF THE INVENTION (1) Field of the Invention

The present invention relates to an image control apparatus, and more particularly to an image control apparatus for controlling a process of coding an image signal.

(2) Description of the Related Art

Image coding processes such as MPEG standardized by ISO/IEC and H.262 standardized by ITU-T introduce bidirectional predictive coded images (B pictures) in addition to intraframe predictive images (I pictures) and interframe forward predictive images (P pictures).

Data in each of those pictures is divided into small blocks, and processed in each of the blocks. Bidirectional prediction is a process of predicting an image frame using image frames in the past and future, and uses I pictures and P pictures for prediction.

A resultant encoded data stream comprises an I picture at its start and some B pictures inserted between I and P pictures or between P pictures (IBBPBBPB . . . ). A collection of pictures including an I picture at its start is called GOP (group of pictures).

In the conventional GOP, the number of repeated B pictures is generally 2. Such a value is suitable for average picture patterns, and other values than 2 may be appropriate for some picture patterns. Accordingly, no optimum coding process has heretofore been carried out in the art.

For example, as an input image is closer to a still image, a suitable value for B pictures increases. Therefore, the coding efficiency increases by detecting the motion of an input image and changing the number of repeated B pictures depending on the extent of the detected motion.

When a scene change occurs, the image quality is often improved by performing the intraframe coding process. Heretofore, it has been customary to carry out the intraframe coding process with fixed timing irrespective of a scene change. The coding efficiency has been poor because the intraframe coding process has not been carried out appropriately depending on the state of input images.

SUMMARY OF THE INVENTION

It is therefore an object of the present invention to provide an image control apparatus which is capable of coding an image signal with increased efficiency for improved image quality.

To achieve the above object, there is provided in accordance with the present invention an image control apparatus for controlling a process of coding an image signal. The image control apparatus includes comparison processing means for carrying out at least one of a first comparison process to compare a motion vector with a threshold, a second comparison process to compare a motion-compensated predictive error with a threshold, and a third comparison process to compare a difference value produced by subtracting the motion-compensated predictive error from an interframe difference with a threshold, and repetitive number control means for adaptively controlling the number of repeated B pictures to be inserted into a stream based on the compared result of the comparison process which is carried out by the comparison processing means.

To achieve the above object, there is also provided in accordance with the present invention an image control apparatus for controlling a process of coding an image signal. The image control apparatus includes scene change detecting means for detecting the occurrence of a scene change based on an interframe difference average representing an average of interframe differences of one picture, and picture insertion control means for inserting an I picture into a stream if a scene change is detected by the scene change detecting means.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 8 is a diagram showing a matrix table managed by a matrix processor in B value controller shown in FIG. 6;

DESCRIPTION OF THE PREFERRED EMBODIMENTS

Figure 1:
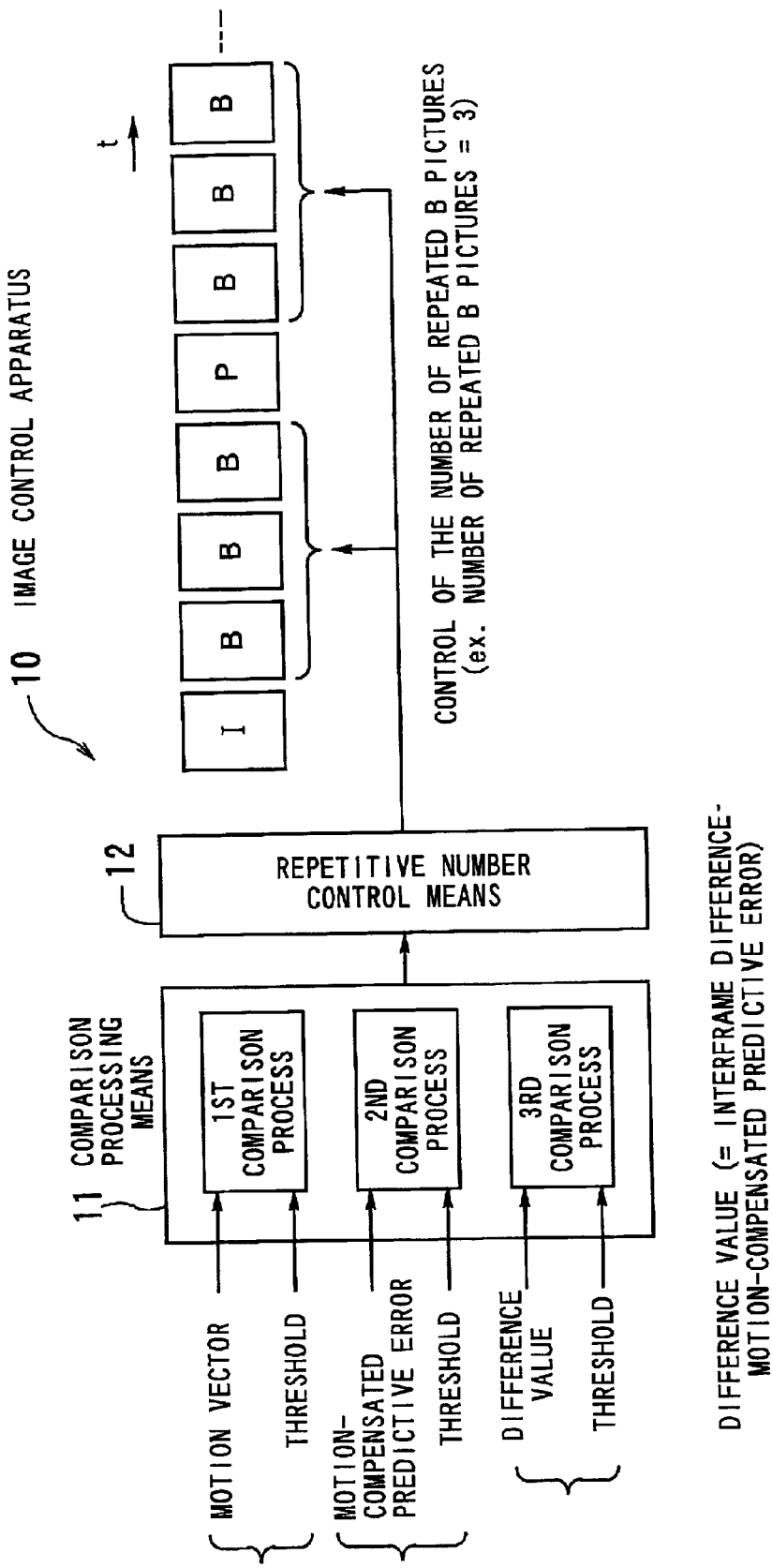
FIG. 1 is a block diagram showing the principles of an image control apparatus according to the present invention.

FIG. 1 shows in block form the principles of an image control apparatus 10 according to the present invention. The image control apparatus 10 serves to control a process of coding an image signal.

As shown in FIG. 1, the image control apparatus 10 has a comparison processing means 11 for carrying out first through third comparison processes. The first comparison process compares a motion vector (a forward predictive vector with respect to a previous frame) with a threshold. The second comparison process compares a motion-compensated predictive error with a threshold. The third comparison process compares a difference value (=an interframe difference−a motion-compensated predictive error) with a threshold. The comparison processing means 11 outputs information representing the results of these comparison processes to a repetitive number control means 12.

Based on the information representing the results of the comparison processes from the comparison processing means 11, the repetitive number control means 12 adaptively controls the number of repeated B pictures in a GOP. In FIG. 1, the number of repeated B pictures is 3.

Figure 2:
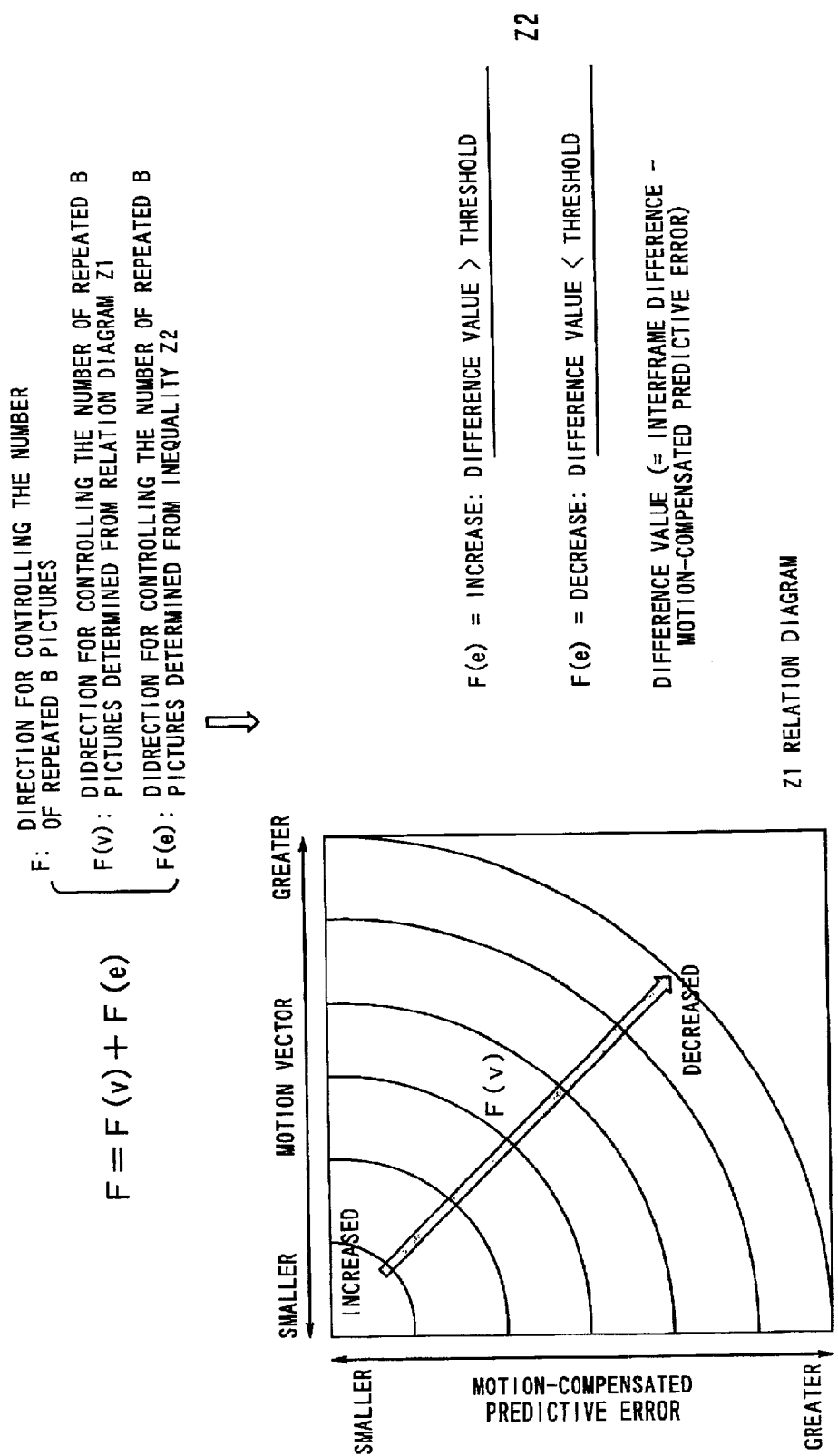
FIG. 2 is a diagram showing the concept of a process of adaptively controlling the number of repeated B pictures.

A process of adaptively controlling the number of repeated B pictures will be described below. FIG. 2 shows the concept of the process of adaptively controlling the number of repeated B pictures. A direction F for controlling the number of repeated B pictures is determined by the sum of a direction F(v) for controlling the number of repeated B pictures which is determined by a relation diagram Z1 and a direction F(e) for controlling the number of repeated B pictures which is determined by an inequality Z2.

The relation diagram Z1 has a horizontal axis representing a motion vector and a vertical axis a motion-compensated predictive error. As the direction F(v) which is determined by the motion vector and the motion-compensated predictive error is pointed obliquely upward to the left in the relation diagram Z1, the number of repeated B pictures increases, and as the direction F(v) is pointed obliquely upward to the right, the number of repeated B pictures decreases.

When the value of the motion vector is smaller, since an image to be coded is closer to a still image, the direction F(v) is controlled to increase the number of repeated B pictures.

When the motion-compensated predictive error is smaller, since an image to be coded is closer to a still image or the motion vector is detected properly, the direction F(v) is controlled to increase the number of repeated B pictures.

As the number of repeated B pictures increases, the time difference between a reference frame and a frame to be coded increases. Therefore, a tendency arises to detect the motion vector improperly and increase the motion-compensated predictive error. Specifically, when the number of repeated B pictures increases, the proportion of B pictures in the GOP increases and the coding efficiency increases. However, because the effect of motion compensation tends to be reduced, the direction F(v) should be controlled at a well balanced value in view of a trade-off between positive aspects resulting from the increased number of repeated B pictures and negative aspects resulting from the improper detection of the motion vector.

The inequality Z2 represents the comparison between the difference value produced by subtracting the motion-compensated predictive error from the interframe difference and the threshold. If the difference value is greater than the threshold, then the direction F(e) increases the number of repeated B pictures. If the difference value is smaller than the threshold, then the direction F(e) reduces the number of repeated B pictures.

If the value of the motion-compensated predictive error is not smaller than the value of the interframe difference, then since the motion detection does not function well, the direction F(e) is controlled to reduce the number of repeated B pictures. Otherwise, the direction F(e) is controlled to increase the number of repeated B pictures.

Figure 3:
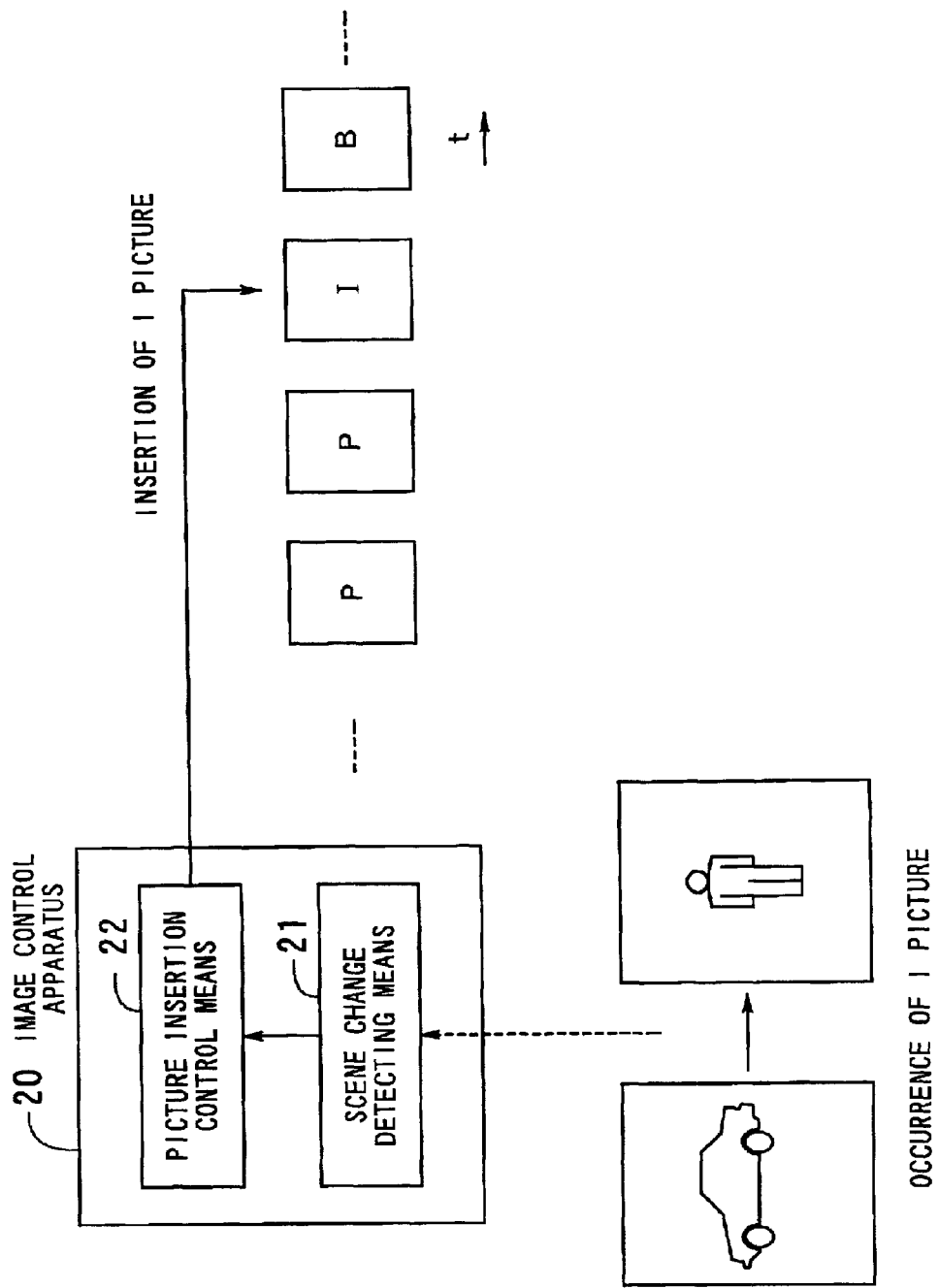
FIG. 3 is a block diagram showing the principles of an image control apparatus according to the present invention.

An image control apparatus according to the present invention for inserting an I picture when a scene change occurs will be described below. FIG. 3 shows in block diagram of such an image control apparatus 20. The image control apparatus 20 serves to control a process of coding an image signal.

As shown in FIG. 3, the image control apparatus 20 has a scene change detecting means 21 for detecting the occurrence of a scene change based on an interframe difference average of interframe differences of the same picture.

The interframe difference average represents an average of differences between blocks or pixels in a frame (t−1) and a frame t which are of the same picture, e.g., P picture.

The image control apparatus 20 also has a picture insertion control means 22 for inserting an I picture into a stream, i.e., performing an intraframe coding process, if a scene change is detected by the scene change detecting means 21.

The detection of a scene change will be described below. If one of the following situations occurs, then it is regarded as the occurrence of a scene change.

(1) The interframe difference average is greater than a threshold. This situation is considered to be a scene change in the entire view.

(2) The difference between a block average of pixel data in each of blocks converted from a picture and the interframe difference average is determined, and there are many blocks where the determined difference is large. This situation is considered to be a scene change in a partial view, e.g., the background remains unchanged and a person suddenly appears in the scene.

(3) The combination of the situations (1) and (2). Specifically, the interframe difference average is greater than a threshold, and also the difference between a block average of pixel data in each of blocks converted from a picture and the interframe difference average is determined, and there are many blocks where the determined difference is large.

(4) A change in the interframe difference average is greater than a given value and represents an abrupt change.

(5) The interframe difference average is lower than a threshold, and also a change in the interframe difference average is greater than a given value and represents an abrupt change.

Figure 4:
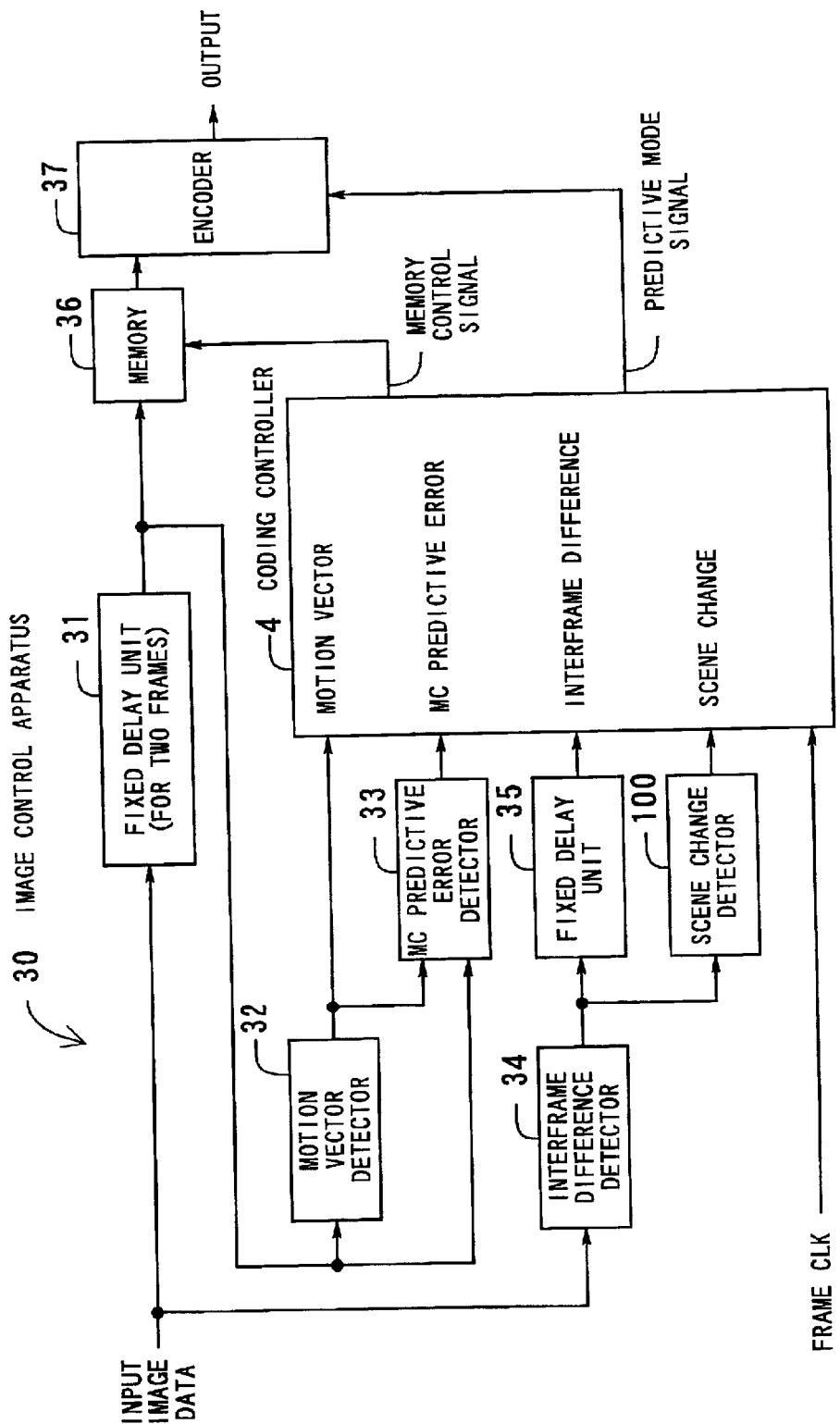
FIG. 4 is a block diagram showing a detailed arrangement of an image control apparatus according to the present invention.

An image control apparatus which has the functions of both the image control apparatus 10, 20 will be described below. FIG. 4 shows in block form such an image control apparatus 30.

The image control apparatus 30 is a specific apparatus which performs the function to adaptively control the number of repeated B pictures and the function to insert an I picture upon the occurrence of a scene change.

As shown in FIG. 4, the image control apparatus 30 has a fixed delay unit 31 for delaying input image data for a time required to detect a scene change for time adjustment, and a motion vector detector 32 for detecting a motion vector between a frame (t−1) and a frame t and transmitting the value of the detected motion vector to a coding controller 4. While motion compensation (also referred to as MC) is also carried out by an encoder 37, the motion vector detector 32 detects a motion vector in advance for determining the number of repeated B pictures.

The image control apparatus 30 also has an MC predictive error detector 33 which shifts a stored previous frame according to the motion vector, detects an MC predictive error which represents; a shift from the present frame, and transmits the value of the detected MC predictive error to the coding controller 4.

The image control apparatus 30 also has an interframe difference detector 34 for detecting an interframe difference between a frame (t−1) and a frame t, and a fixed delay unit 35 for delaying a received interframe difference for adjusting the time of a process carried out by a scene change detector 100 and transmitting the value of the delayed interframe difference to the coding controller 4.

The scene change detector 100 detects a scene change based on the interframe difference, and transmits a 1-bit signal representing whether a scene change has occurred or not to the coding controller 4.

Based on a frame CLK (clock), the coding controller 4 processes the supplied data, generates a memory control signal to control a memory 36, and applies the memory control signal to the memory 36. The coding controller 4 also transmits a predictive code signal indicative of an I, P, or B picture to the encoder 37.

Based on the memory control signal from the coding controller 4, the memory 36 writes or reads image data transmitted from the fixed delay unit 31.

The encoder 37 encodes an image signal transmitted from the memory 36 based on the predictive mode signal from the coding controller 4. For example, if the predictive mode signal indicates an I picture, then the encoder 37 performs an intraframe predictive coding process on an image signal transmitted from the memory 36.

Figure 5:
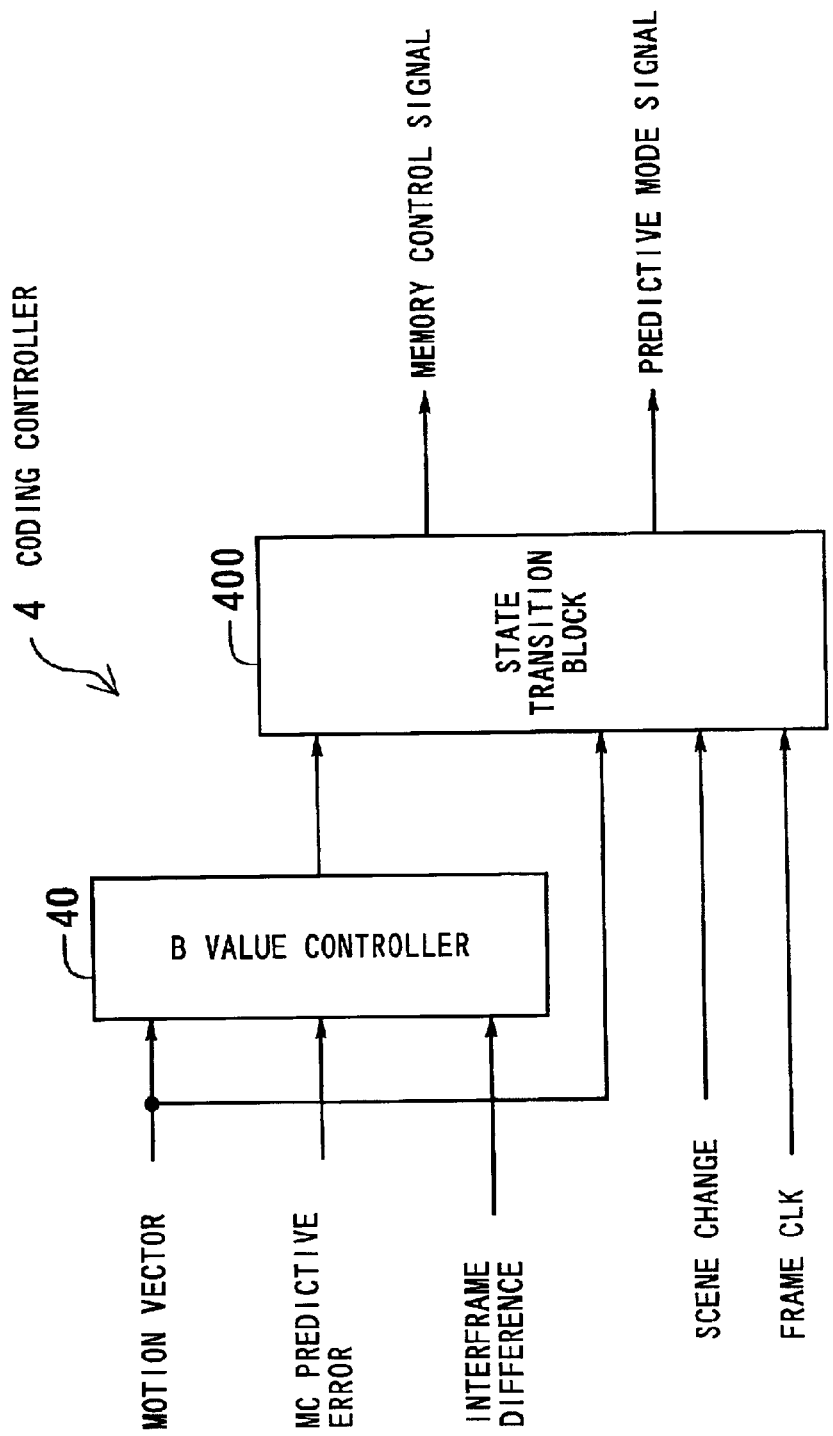
FIG. 5 is a block diagram of a coding controller in the image control apparatus shown in FIG. 4.

FIG. 5 shows in block form the coding controller 4. The controller 4 comprises a B value controller 40 and a state transition block 400.

The B value controller 40 determines an increase (Inc), a hold (H), or a decrease (Dec) of the number of repeated B pictures based on a motion vector, an MC predictive error, and an interframe difference. The state transition block 400 controls transitions of I, P, B pictures when a scene change is detected and when the B value controller 40 determines that the number of repeated B pictures needs to be increase or decrease.

Figure 6:
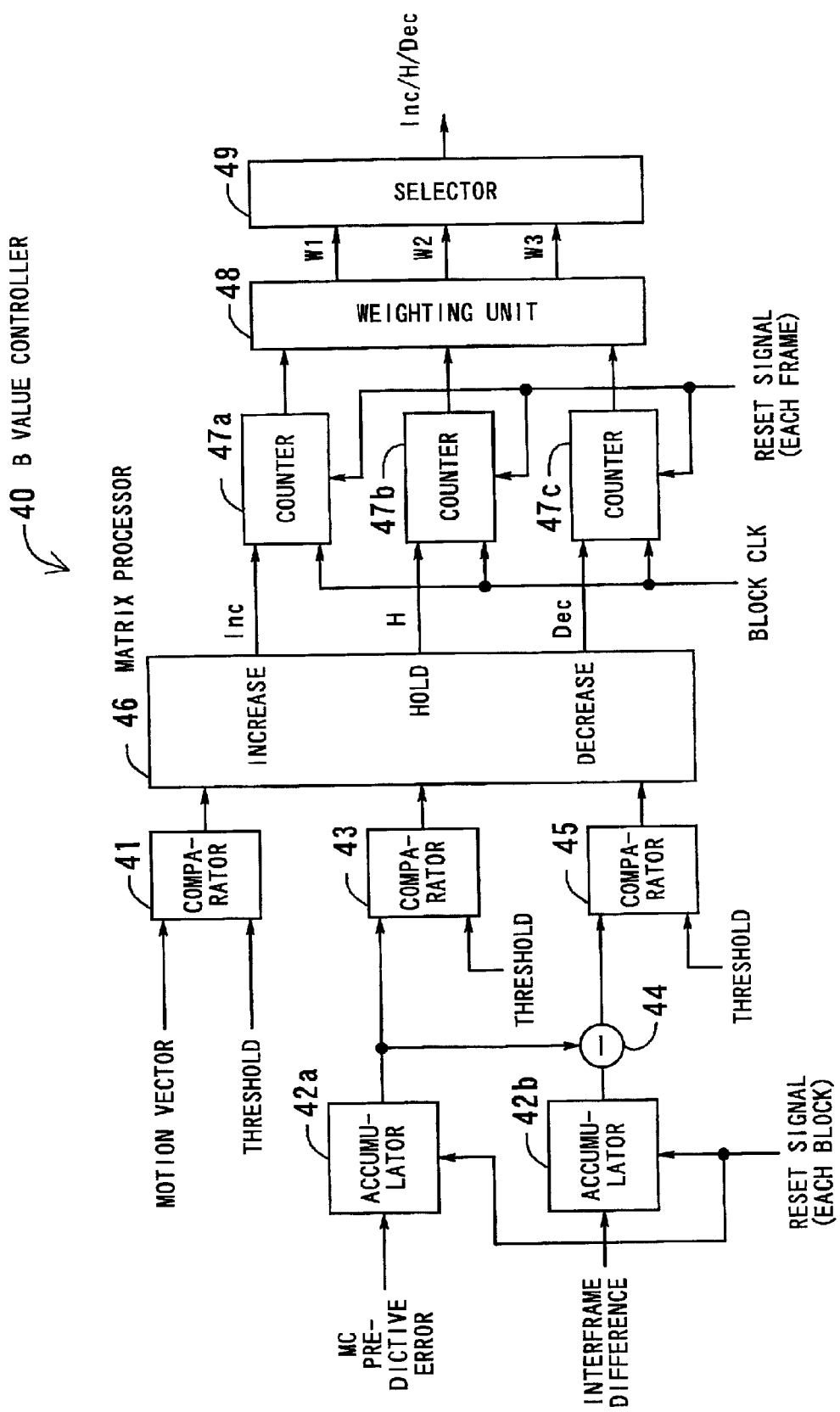
FIG. 6 is a block diagram of a B value controller in the coding controller shown in FIG. 5.

FIG. 6 shows in block form the B value controller 40. The B value controller 40 has a comparator 41 for comparing a motion vector with a threshold and accumulators 42a, 42b for accumulating MC predictive errors and interframe differences in each block in response to a reset signal in each block, which is a basic unit in image coding applications.

The B value controller 40 has a comparator 43 for comparing an accumulated MC predictive error with a threshold, a subtractor 44 for subtracting an accumulated MC predictive error from an accumulated interframe difference, and a comparator 45 for comparing the difference with a threshold.

The B value controller 40 also has a matrix processor 46 for receiving compared results from the comparators 41, 43, 45 and determining and outputting Inc/H/Dec in each block based on a decision reference established therein.

Counters 47a–47c counts blocks to be increased, held, or decreased per frame (one view) based on a block CLK. A weighting unit 48 weights counts outputted from the counters 47a–47c, and outputs respective signals W1–W3. A selector 49 selects one of the signals W1–W3 which represents the greatest number of blocks, and uses the selected signal as final determined results Inc/H/Dec.

Figure 7:
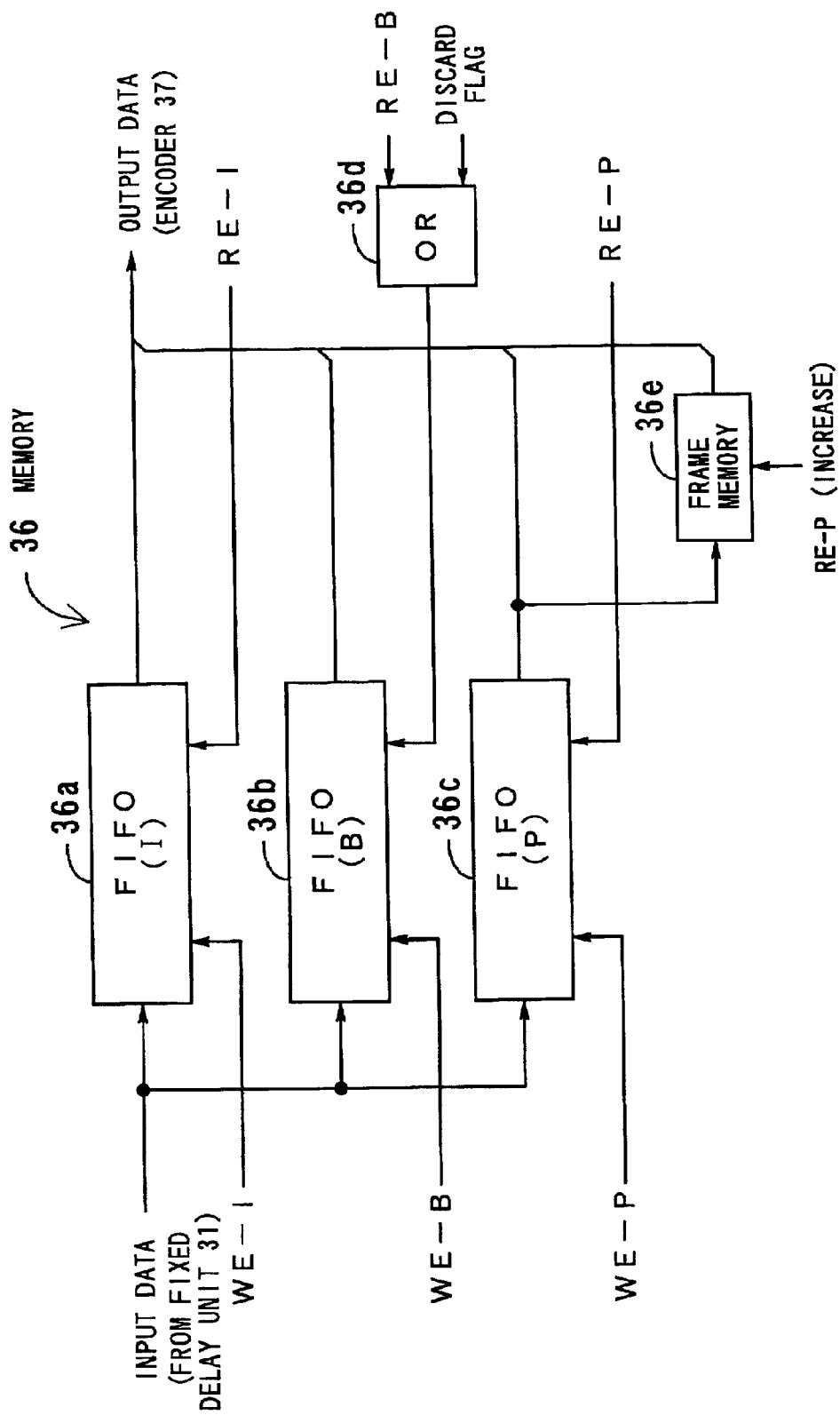
FIG. 7 is a block diagram of a memory in the image control apparatus shown in FIG. 4.

FIG. 7 shows the memory 36 in detail. As shown in FIG. 7, the memory 36 comprises three FIFO memories 36a–36c for storing I, B, P pictures, an OR gate 36d, and a frame memory 36e for increasing the number of P pictures.

Based on a memory control signal from the coding controller 4, the memory 36 separates I/P/B pictures and stores them in the respective FIFO memories 36a–36c. When output data are to be transmitted from the memory 36 to the encoder 37, image frames need to be rearranged according to I/B/P pictures. Such rearrangement of image frames is performed by changing selected ones of the FIFO memories 36a–36c from which to read the I, B, P pictures. For increasing the number of B pictures, one repetition of P pictures occurs. For reducing the number of B pictures, one B picture is discarded.

Signals WE-I, B, P, RE-I, B, P, a discard flag, a and a signal RE-P (increase) are included in the memory control signal.

FIG. 8 shows a matrix table T managed by the matrix processor 46 shown in FIG. 6. The matrix processor 46 uses the matrix table T to relate the determined results Inc/H/Dec as shown based on 3-bit information representing the results of comparison of the motion vector, the MC predictive error, and the interframe difference with the thresholds. In the matrix table T, "1" represents a condition of being greater than the threshold, and "0" represents a condition of being smaller than the threshold.

The scene change detector 100 will be described below. FIGS. 9 through 13 show different scene change detectors which correspond respectively to the situations (1)–(5), described above, relative to the occurrence of a scene change.

Figure 9:
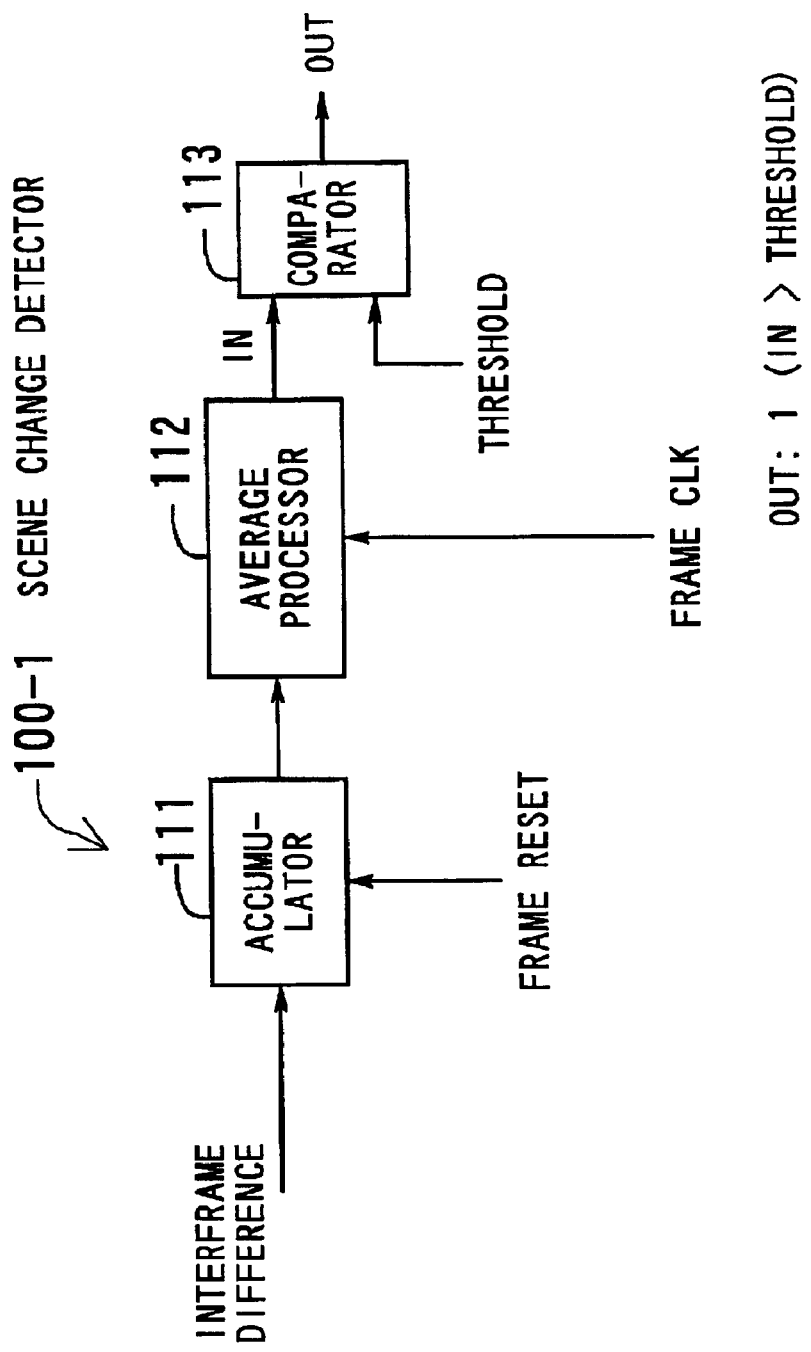
FIG. 9 is a block diagram of a scene change detector.

FIG. 9 shows in block form a scene change detector 100-1. The scene change detector 100-1 has an accumulator 111 for accumulating an interframe difference of each frame in response to a frame reset signal, and an average processor 112 for averaging accumulated interframe differences to generate an interframe difference average according to a frame CLK.

The scene change detector 100-1 also has a comparator 113 for comparing the interframe difference average with a threshold. If the interframe difference average is greater than the threshold, then the comparator 113 detects the occurrence of a scene change. At this time, the comparator 113 produces an output signal OUT of "1", for example.

Figure 10:
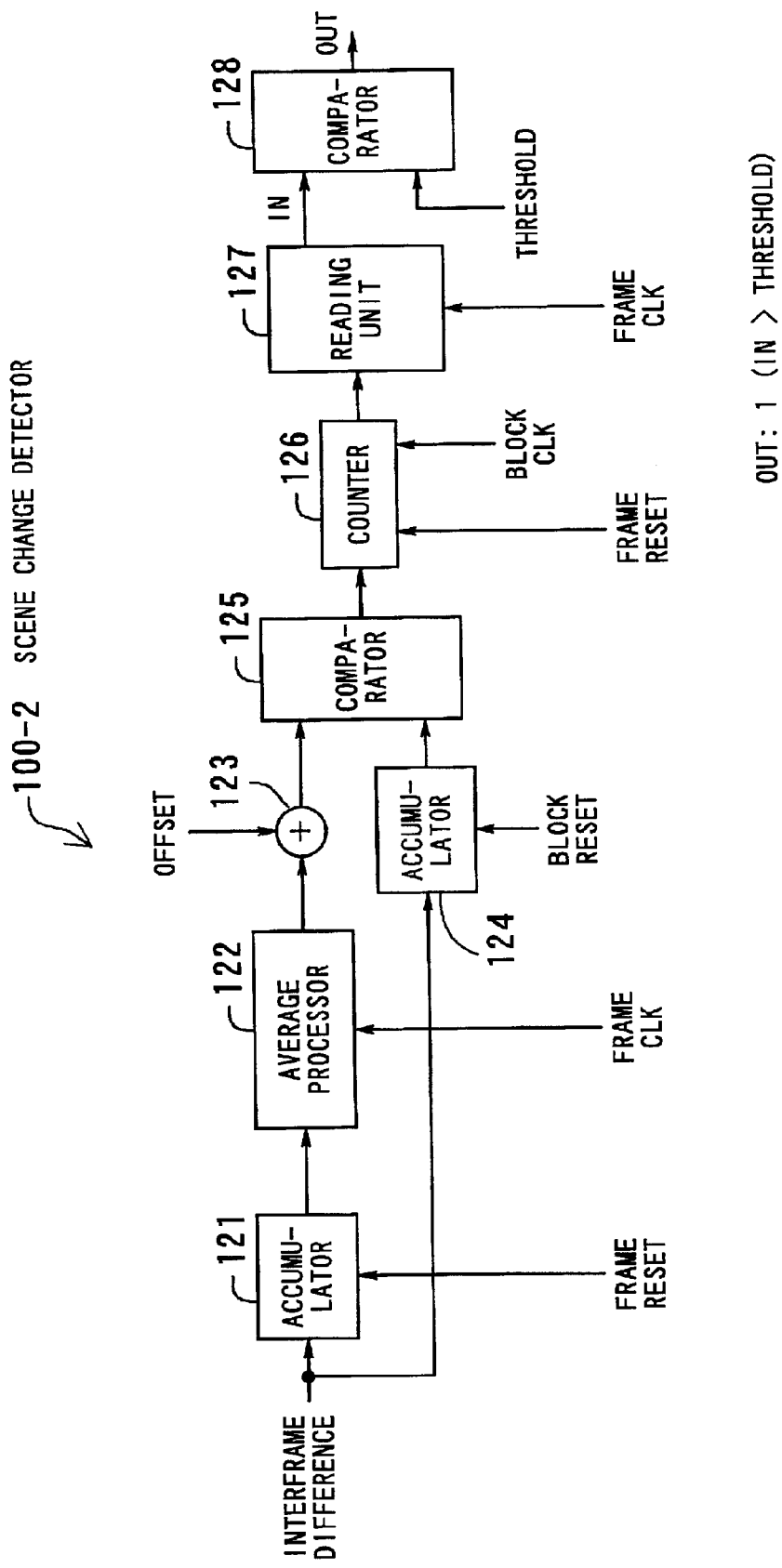
FIG. 10 is a block diagram of another scene change detector.

FIG. 10 shows in block form another scene change detector 100-2. The scene change detector 100-2 has an accumulator 121 for accumulating an interframe difference of each frame in response to a frame reset signal, and an average processor 122 for averaging accumulated interframe differences to generate an interframe difference average according to a frame CLK.

The scene change detector 100-2 also has an accumulator 124 for accumulating an interframe difference of each block and generating a block average in response to a block reset signal.

In order to determine whether the difference between the interframe difference average and the block average is large or not, an adder 123 adds an offset to the interframe difference average. A comparator 125 compares the interframe difference average to which the offset is added with the block average, and outputs a 1-bit signal indicative of whether the difference therebetween is large or not, in each block.

In response to a frame reset signal, a counter 126 counts an output signal from the comparator 125 according to a block CLK, and outputs a count in each frame.

A reading unit 127 reads the count from the counter 126 in response to a frame CLK, and a comparator 128 compares the read count with a threshold. If the count is greater than the threshold, then the comparator 128 detects the occurrence of a scene change. At this time, the comparator 128 produces an output signal OUT of "1", for example.

Figure 11:
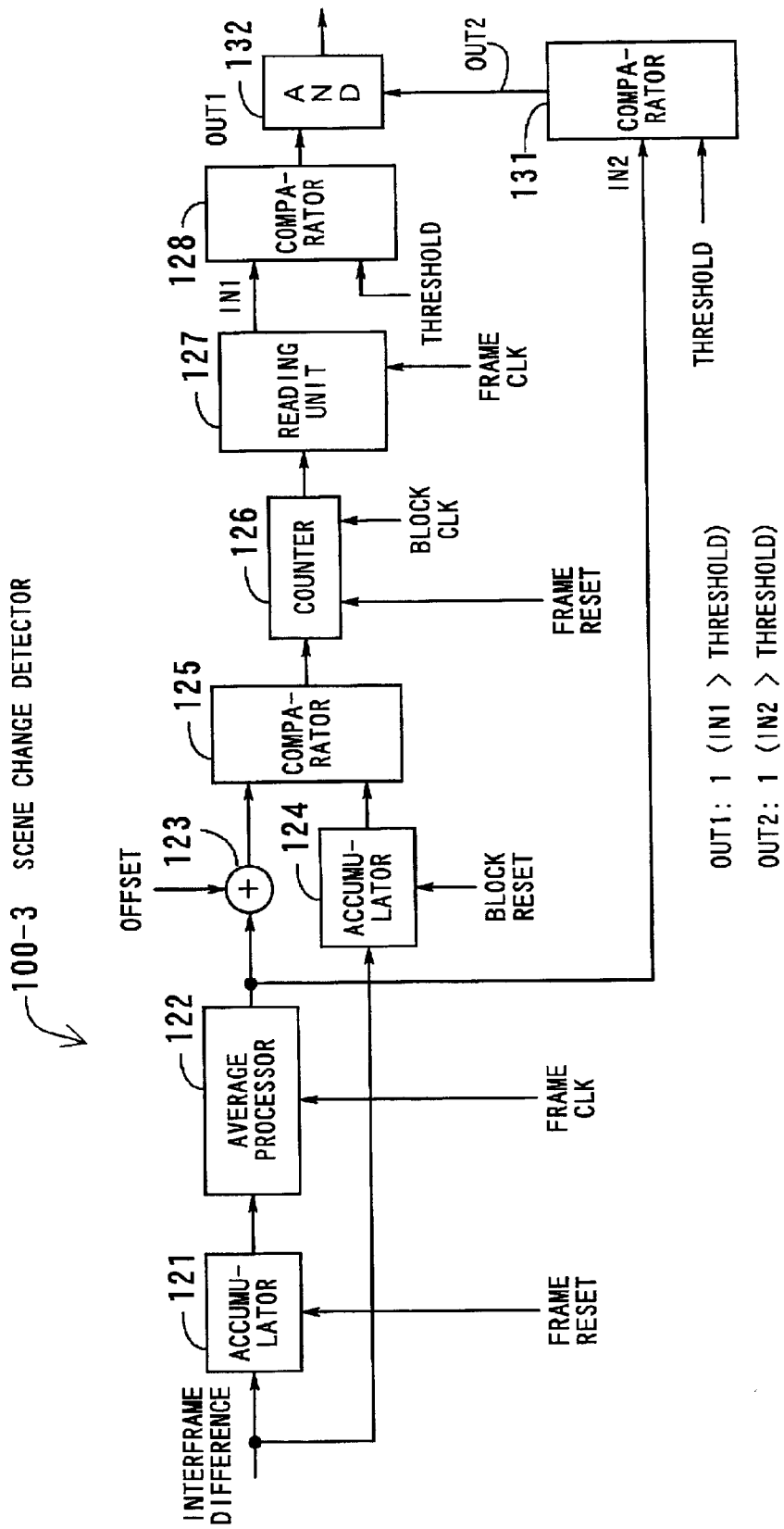
FIG. 11 is a block diagram of still another scene change detector.

FIG. 11 shows in block form still another scene change detector 100-3. Those parts of the scene change detector 100-3 which are identical to those of the scene change detector 100-2 shown in FIG. 10 are denoted by identical reference characters, and will not be described in detail below.

The scene change detector 100-3 has a comparator 131 for comparing the interframe differential average from the average processor 122 with a threshold. If the interframe differential average is greater than the threshold, then the comparator 131 produces an output signal OUT2 of "1". The scene change detector 100-3 also has an AND gate 132 for ANDing the output signal OUT1 from the comparator 128 and the output signal OUT2 from the comparator 131. The AND gate 132 produces an output signal of "1" when a scene change occurs.

Figure 12:
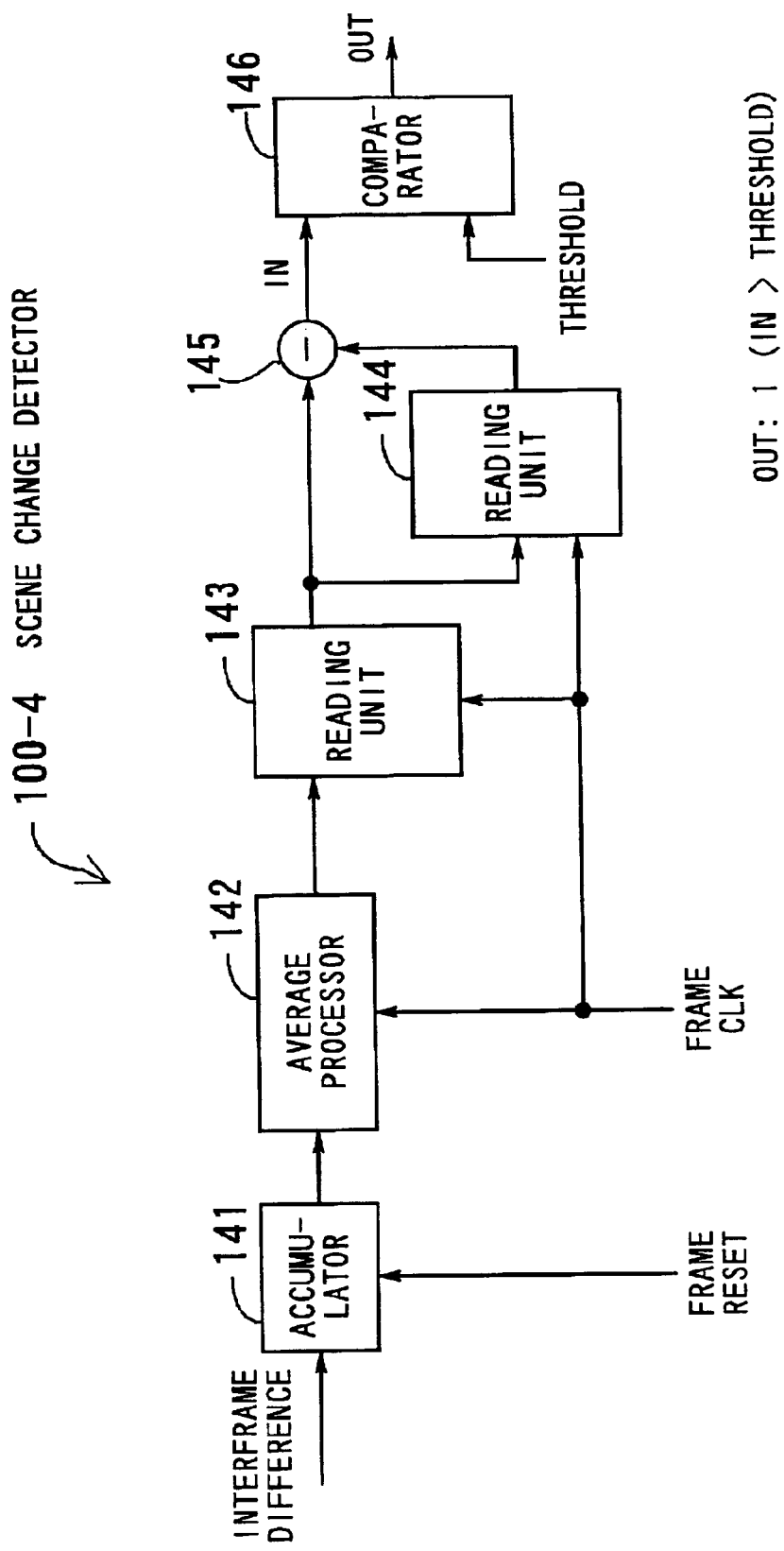
FIG. 12 is a block diagram of yet another scene change detector.

FIG. 12 shows in block form yet another scene change detector 100-4. The scene change detector 100-4 has an accumulator 141 for accumulating an interframe L difference of each frame in response to a frame reset signal, and an average processor 142 for averaging accumulated interframe differences to generate an interframe difference average according to a frame CLK.

A reading unit 143 reads the interframe difference average according to a frame CLK, and a reading unit 144 reads the interframe difference average from the reading unit 143 according to a frame CLK.

A subtractor 145 determines the difference between the interframe difference average (on the previous frame side) outputted from the reading unit 143 and the interframe difference average (on the present frame side) outputted from the reading unit 144.

A comparator 146 compares the difference from the subtractor 145 with a threshold. If the difference is greater than the threshold, then the comparator 146 detects the occurrence of a scene change. At this time, the comparator 146 produces an output signal OUT of "1", for example.

Figure 13:
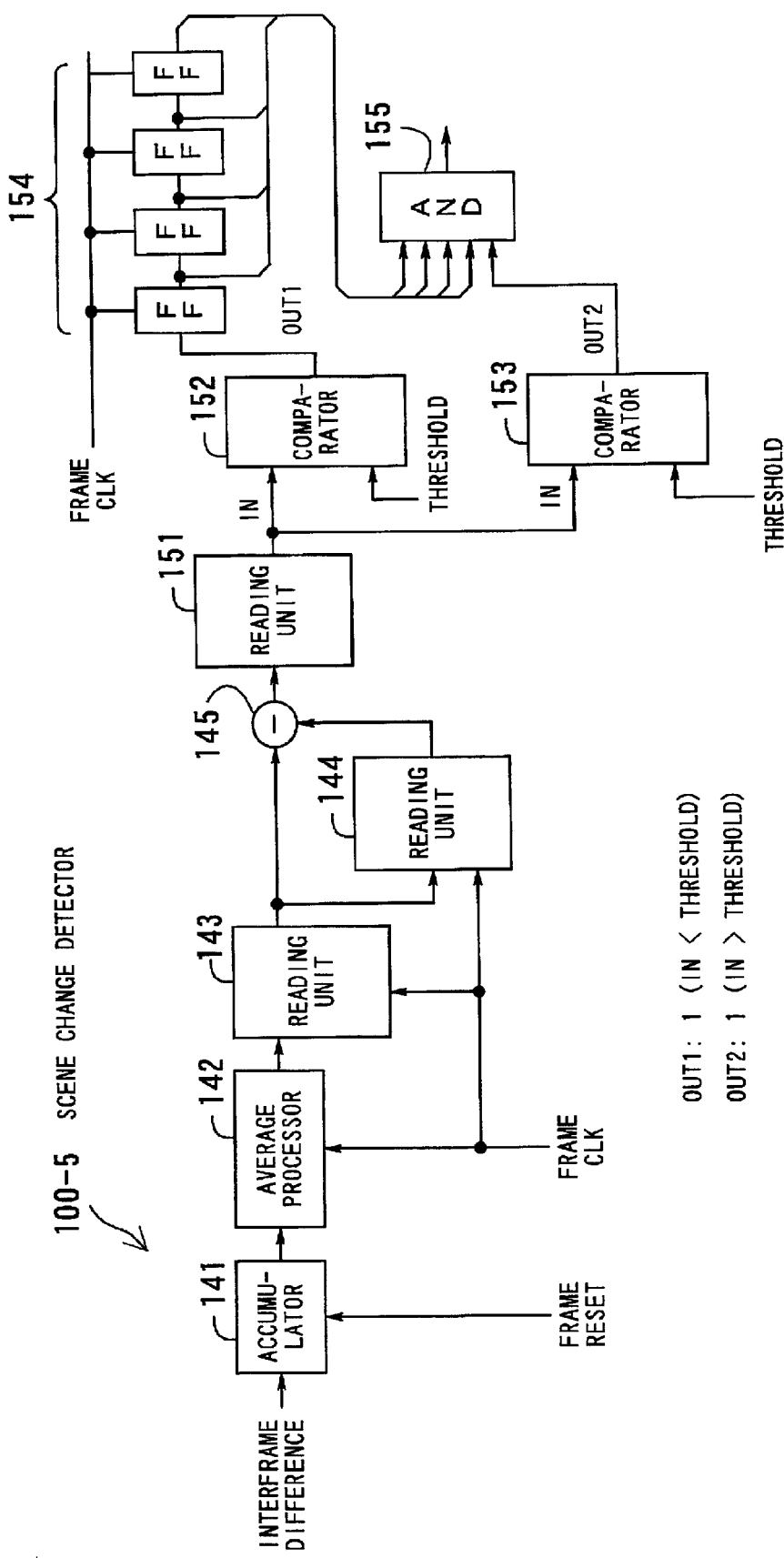
FIG. 13 is a block diagram of yet still another scene change detector.

FIG. 13 shows in block form yet still another scene change detector 100-5. Those parts of the scene change detector 100-5 which are identical to those of the scene change detector 100-4 shown in FIG. 12 are denoted by identical reference characters, and will not be described in detail below.

The scene change detector 100-5 has a reading unit 151 which reads the difference outputted from the subtractor 145, and a comparator 152 which compares the difference IN outputted from the reading unit 151 with a threshold. If the difference IN is smaller than the threshold (IN<threshold), then the comparator 152 regards the scene as stable and produces an output signal OUT1 of "1".

Four flip-flops FF 154 hold respective signals of "1" in response to a frame CLK, and output the signals of "1" to an AND gate 155. If all the output signals from the flip-flops FF 154 are "1", then frames of the same picture pattern are in succession. A comparator 153 compares the difference IN outputted from the reading unit 151 with a threshold. If the difference IN is greater than the threshold (IN>threshold), then the comparator 153 produces an output signal OUT2 of "1" to the AND gate 155.

If all the input signals applied to the AND gate 155 are "1", i.e., if the scene changes from a stable state to an abruptly changing state, then the AND gate 155 produces an output signal OUT2 of "1" representing the occurrence of a scene change.

Figure 14:
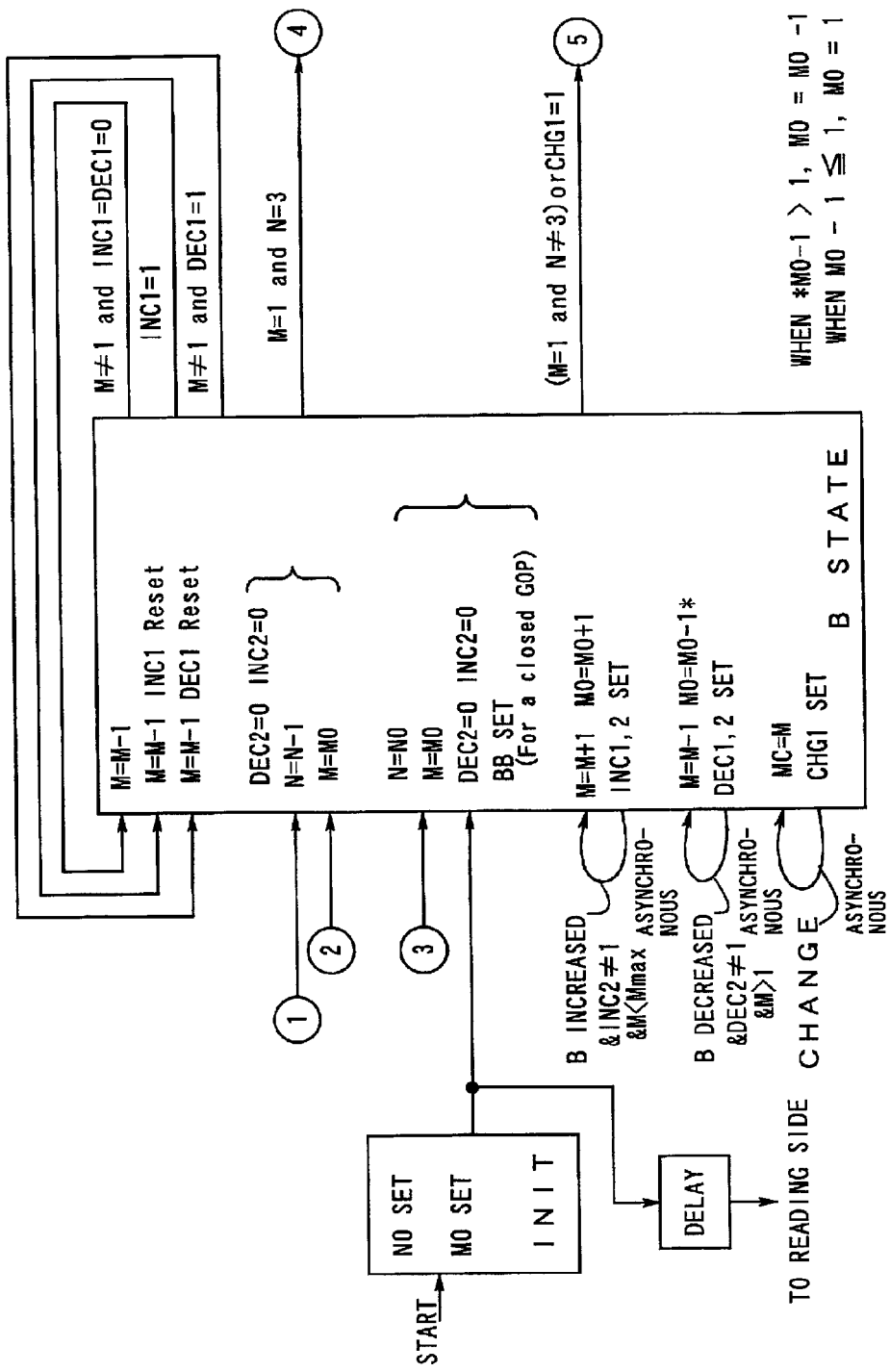
FIG. 14 is a diagram showing a state transition on a writing side.
Figure 15:
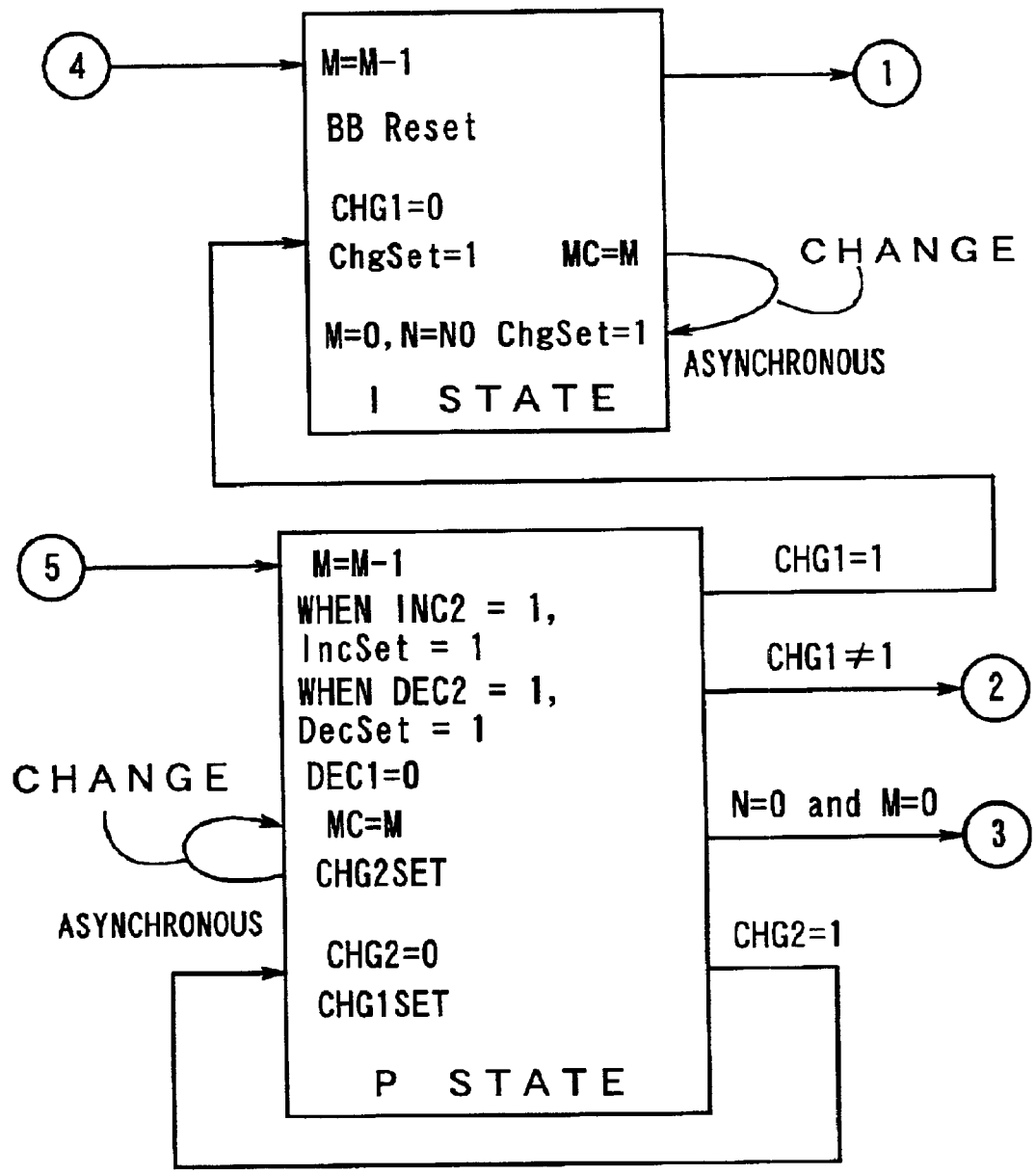
FIG. 15 is a diagram showing a state transition on a writing side.
Figure 16:
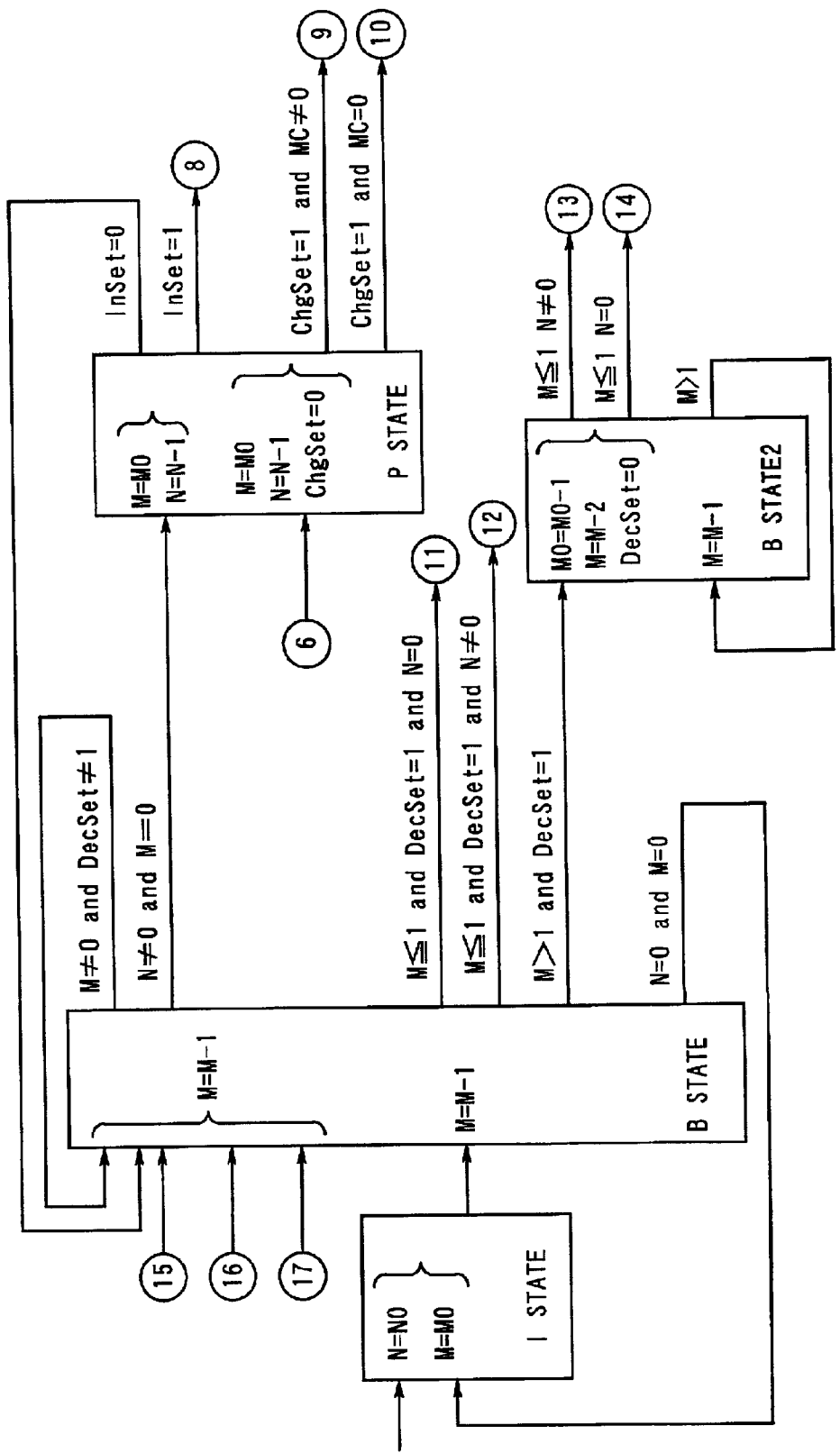
FIG. 16 is a diagram showing a state transition on a reading side.
Figure 17:
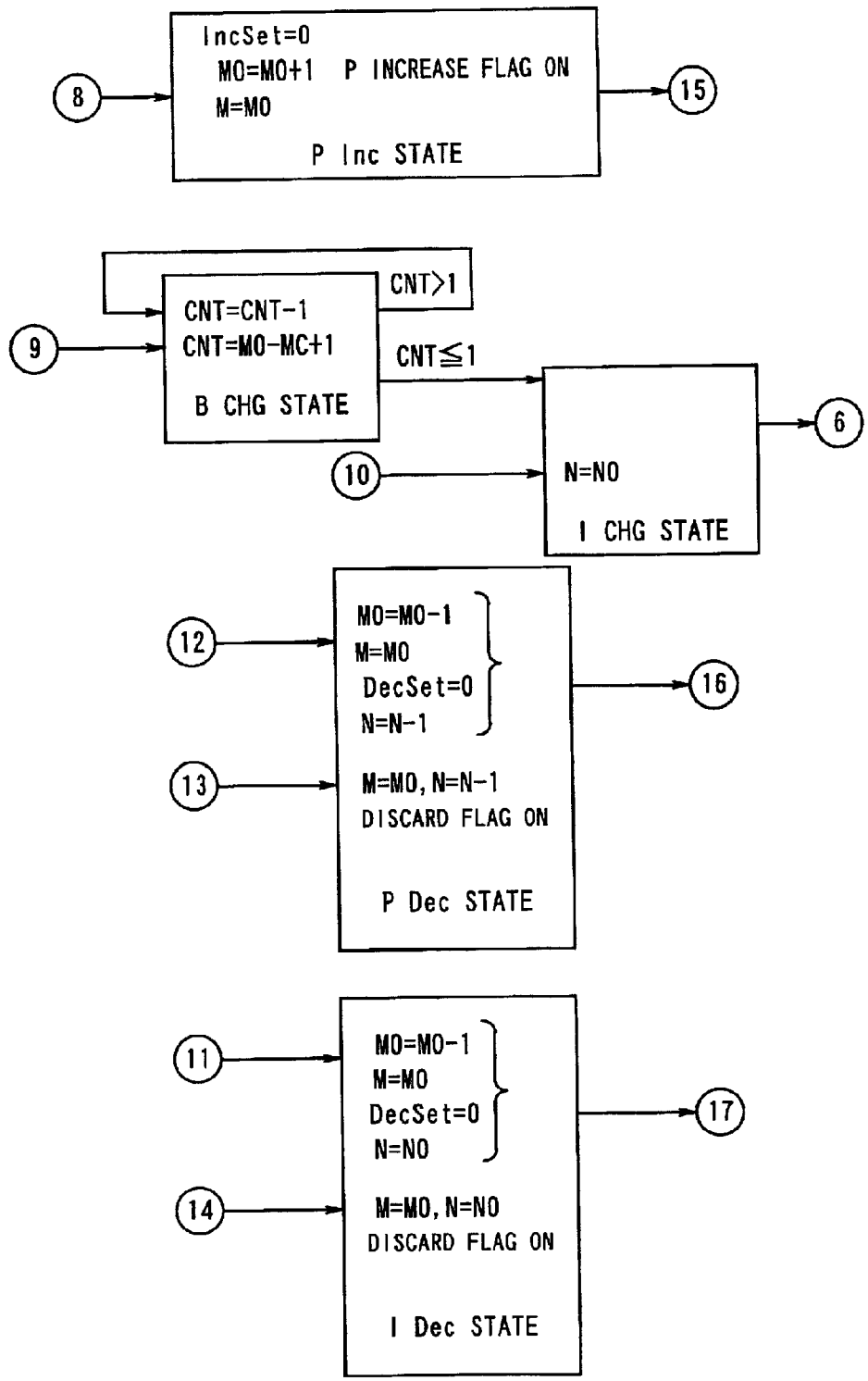
FIG. 17 is a diagram showing a state transition on a reading side.
Figure 18:
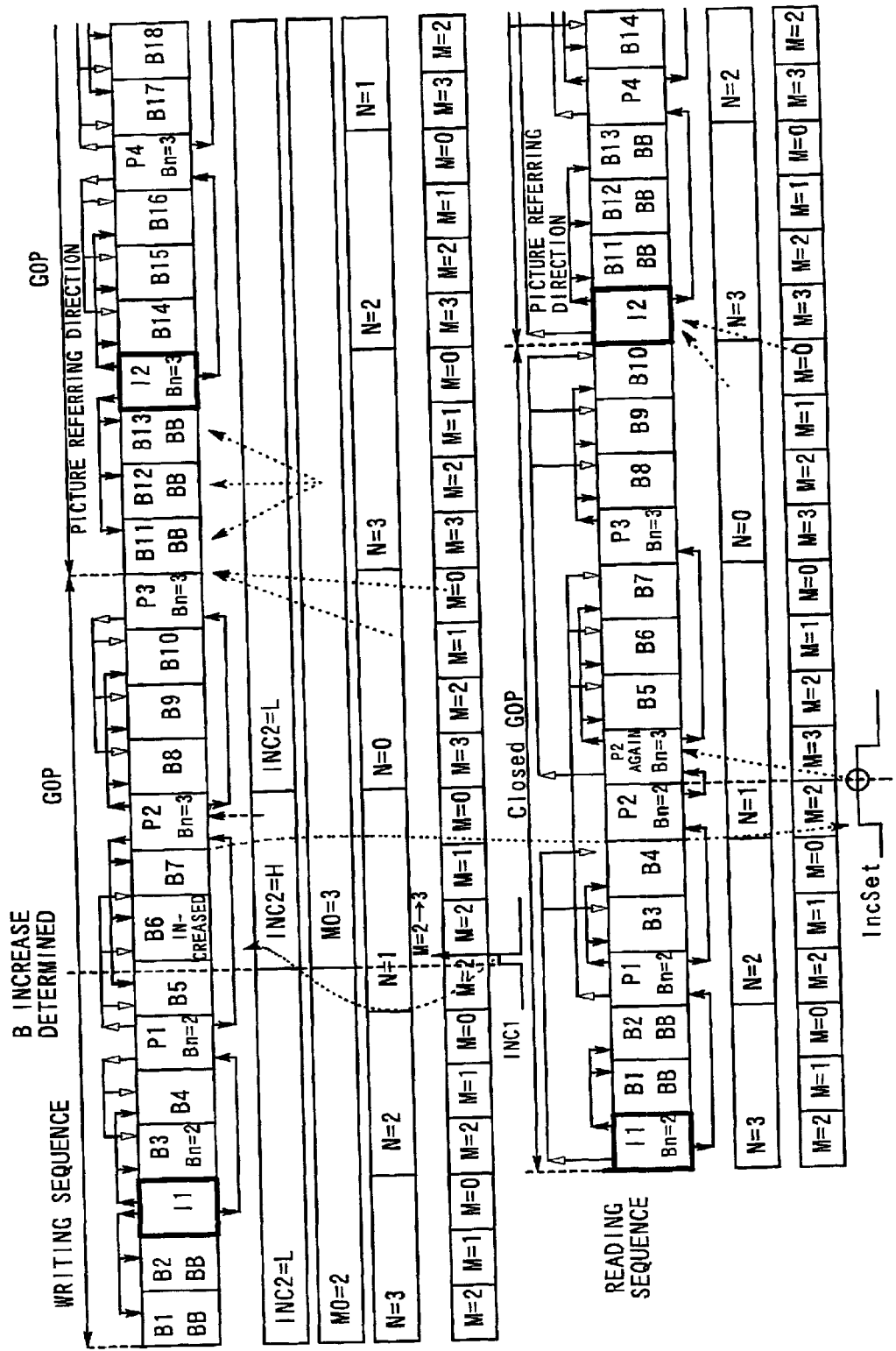
FIG. 18 is a diagram showing writing and reading sequences at the time the number of B pictures increases.
Figure 19:
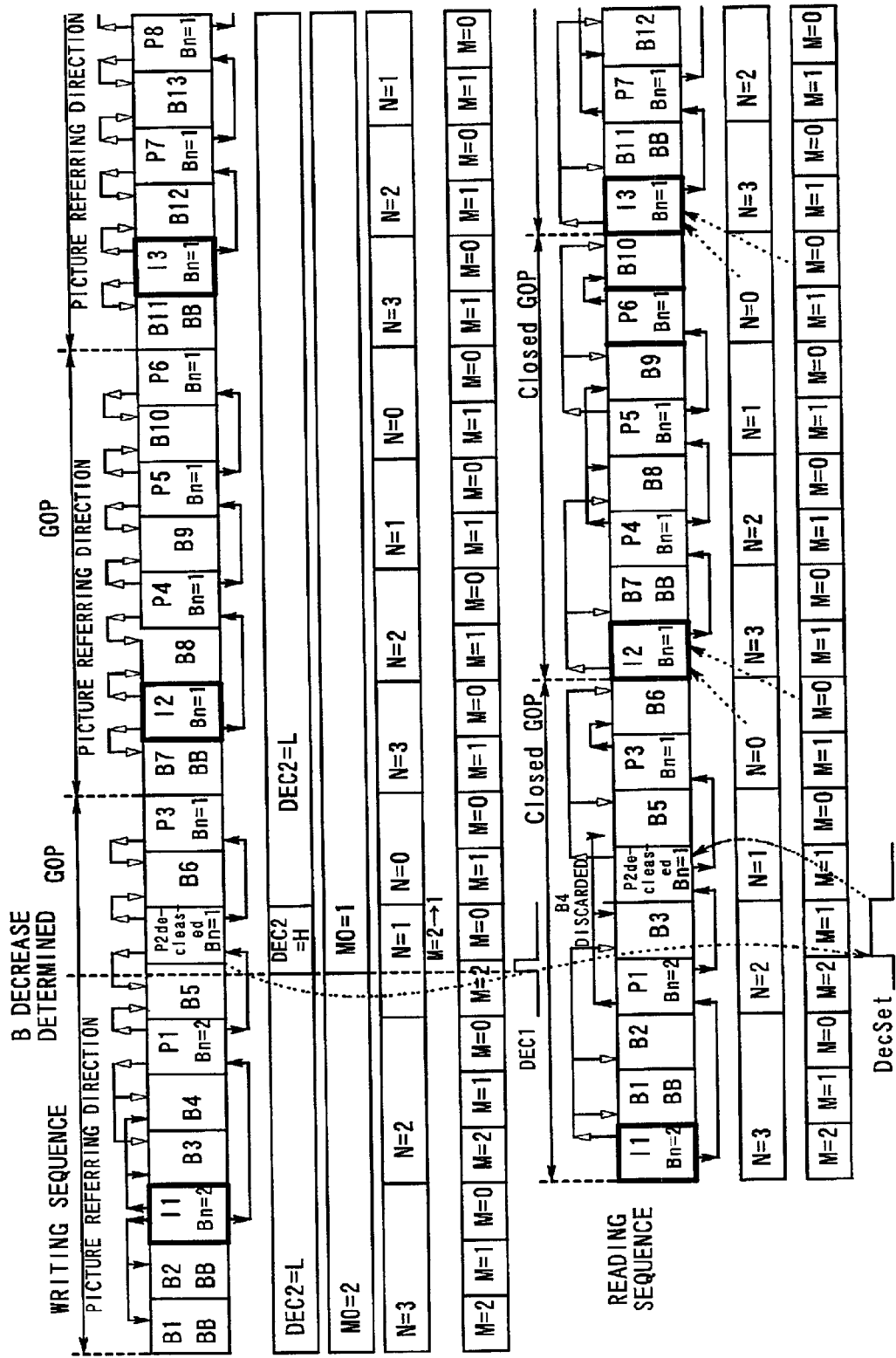
FIG. 19 is a diagram showing writing and reading sequences at the time the number of B pictures decreases.

A state transition process carried out by the state transition block 400 will be described below. FIGS. 14 and 15 are diagrams showing state transitions on a writing side, and FIGS. 16 and 17 are diagrams showing state transitions on a reading side. FIG. 18 is a diagram showing writing and reading sequences at the time the number of B pictures increases, and FIG. 19 is a diagram showing writing and reading sequences at the time the number of B pictures decreases.

First, operation on the writing side will be described below. Common to subsequent state transition operations are that a state transition is performed in each frame and that the number of repeated B pictures is increased and decreased and a state variable is set due to a scene change out of synchronism with each other.

First, in an INIT state, the repetitive period of B pictures is set to M0, the number of I or P pictures in the GOP is set to N0, and variables are reset. The state immediately after initialization is a B state. M0 and N0 are set to temporal variables N, M, respectively. For a closed GOP, a BB flag is set in order to inhibit forward prediction (this corresponds to a writing sequence B1 in FIG. 18).

Since N=3, M=2, BB=set in this state, the condition of "M≠1 and INC1=DEC=0" is satisfied. A next state to transit to is the B state, as can be seen from FIGS. 14 and 15 (this corresponds to a writing sequence B2 in FIG. 18).

As shown in FIGS. 14 and 15, since the value of M is decremented by "1" when returning to the B state, N=3, M=1, BB=set in this state (B2). Therefore, the condition of "M=1 and N=3" is satisfied, and a next state to transit to is an I state, as can be seen from FIGS. 14 and 15.

As shown in FIGS. 14 and 15, when entering the I state, BB is reset thereby inhibiting forward prediction of a B picture at the GOP boundary and realizing a closed GOP. The I state unconditionally transits to the B state (this corresponds to a writing sequence B3 in FIG. 18).

When entering the B state, the value of N is decremented by 1, the value of M is returned to the initial value, and DEC2, INC2 are reset. Since DEC2, INC2 are not originally set, N=M=2, and all other flags are reset. Therefore, the condition of "M≠1 and INC1=DEC=0" is satisfied, and a next state to transit to is the B state again, as can be seen from FIGS. 14 and 15 (this corresponds to a writing sequence B4 in FIG. 18).

As shown in FIGS. 14 and 15, since the value of M is decremented by "1" when returning to the B state, N=2, M=1 in this state. Therefore, the condition of "M=1 and N≠3" are satisfied, and a next state to transit to is a P state (this corresponds to a writing sequence P1 in FIG. 18).

In this state, inasmuch as N=2, M=0, CHG≠1, a next state to transit to is the B state. When returning to the B state, the value of N is decremented by 1, the value of B is set again, and DEC2, INC2 are reset.

If the number of repeated B pictures is neither increased nor decreased and a scene change does not occur, the state transits to B, B, P, B, B, P, B, B, P, B, . . . . If the value of N is 0 when entering the P state, then the next state is the B state as is the case with the other situations, but the value of N is returned to the initial value unlike the other situations. In this manner, transitions (BBI BBP BBP BBP B . . . BP BBP) (BBI BBP . . . ) at the GOP period can be performed.

Operation on the reading side will be described below. The reading side starts a fixed delay later than the writing side. A first state is an I state (see FIGS. 16 and 17), and M0, N0 are put into respective temporal variables N, M. A next state to transit to is unconditionally the B state, as shown in FIGS. 16 and 17 (this corresponds to a reading sequence B1 in FIG. 18). Since the value of M is decremented by "1" when returning to the B state, M=1, N=3 in this state.

Therefore, the condition of "M≠0 and DecSet≠1" is satisfied, and a next state to transit to is also the B state (this corresponds to a reading sequence B2 in FIG. 18).

Since the value of M is decremented by "1" when returning to the B state, M=0, N=3 in this state. Therefore, the condition of "M=0 and N≠0" is satisfied, and a next state to transit to is the P state (this corresponds to a reading sequence P1 in FIG. 18).

When transiting to the P state, the value of M is set again and the value of N is decremented by 1. In this state, therefore, M=2, N=2. If the number of repeated B pictures is not increased and a scene change does not occur, then since the condition of "Incset=0" is satisfied, a next state to transit to is the B state. Subsequently, the state transits to B, B, P, B, B, P, B, B, P, B, . . . .

If the value of N is 0 when entering the B state and M=0 while the B state is being looped, the B state transits to the I state, returning to the initial state (the leading end of the GOP), as shown in FIGS. 16 and 17. In this manner, transitions (IBB PBB PBB PBB PB . . . PBB) (IBB PBB . . . ) at the GOP period can be performed.

Operation at the time the number of repeated B pictures is increased will be described below. An increase in the number of repeated B pictures is monitored in the B state on the writing side (see FIGS. 14 and 15). If a process of requesting a previous increase has been finished (INC2≠1), the value of M does not exceed the maximum value, and an increase is determined while in the B state on the writing side, an increase request flag INC1/2 is set to asynchronism, and the values of M, M0 are incremented by 1. The B state is looped until the value of M becomes 1.

If an increase is determined in a writing sequence B5 in FIG. 18, then as shown in FIG. 18, INC1, 2 are set at the terminal end of the writing sequence B5, the value of M0 is incremented to 3 by 1, and the value of M is incremented from 2 to 3 by 1. Since the condition of "INC1=1" is satisfied, a next state of the writing sequence B5 to transit to is the B state again, as can be seen from FIGS. 14 and 15.

When transiting to a writing sequence B6 shown in FIG. 18, the value of M is decremented by 1 and INC1 is reset, as shown in FIGS. 14 and 15. In the writing sequence B6, therefore, M=2, IN1=0, INC2=1. According to the transition diagrams shown in FIGS. 14 and 15, the B state is looped until the value of M becomes 1.

Because the condition of "M=1 and N≠3" is satisfied in a writing sequence B7 shown in FIG. 18, a next state to transit to is the P state. Since INC2=1 in a writing sequence P2 shown in FIG. 18, a flag IncSet for increasing the number of repeated B pictures on the reading side is set to 1.

A next state of the writing side to transit to is the B state as CHG≠1. When transiting to a writing sequence B8 shown in FIG. 18, N is decremented, M is set again, and INC2 is reset. Subsequently, until M becomes 1, the B state is looped, and after the B state transits to the P state, the P state returns to the B state. If the condition of "N=0 and M=0" is satisfied (e.g., a writing sequence P3 shown in FIG. 18) when transiting to the P state, then N is initialized to initialize the GOP when transiting to the B state.

INC2 is used as a condition to determine an increase the number of repeated B pictures in order to limit the unit by which to increase the number of repeated B pictures between I or P pictures to 1. As shown in FIG. 18, usually, there is a time difference of about one picture between I and P pictures that are written and between I and P pictures that are read. Since the number of repeated B pictures between I and P pictures or P and P pictures is at most 1, if the number of repeated B pictures is increased on the writing side, I, P pictures are written and read substantially in phase with each other (they are read slightly later than they are written).

Therefore, as shown in FIG. 18, if IncSet is set on the writing side, then IncSet appears in phase with the P state on the reading side. On the reading side, if IncSet is set at the time of transiting to the P state (a reading sequence P2 shown in FIG. 18, then as shown in the transition diagrams of FIGS. 16 and 17, the P state transits to a PInc state. When transiting to the PInc state, the value of M is incremented by 1 and IncSet is reset. A flag indicative of an increase in the number of repeated P pictures is outputted while in the PInc state.

The flag indicative of an increase in the number of repeated P pictures is connected to REN-P (increase) in the block diagram of the memory 36, and data of a P2 state is outputted again by outputting data on an FM side. Transitions after the PInc state are the same as with the ordinary P state, except that the number of repeated B pictures increases as the value of M is incremented by 1.

Operation at the time the number of repeated B pictures is decreased will be described below. A decrease in the number of repeated B pictures is monitored in the B state on the writing side (see FIGS. 14 and 15). If a process of requesting a previous decrease has been finished, the value of M exceeds 1, and a decrease is determined while in the B state on the writing side, a decrease request flag DEC1/2 is set to asynchronism, and the values of M, M0 are decremented by 1. The B state is looped until the value of M becomes 1.

If a decrease is determined in a writing sequence B5 in FIG. 19, then as shown in FIG. 19, DEC1, 2 are set at the terminal end of the writing sequence B5, the value of M0 is decremented to 1 by 1, and the value of M is decremented from 2 to 1 by 1. In FIGS. 14 and 15, since the condition of "M=1 and N≠3" is satisfied, a next state of the writing sequence B5 to transit to is the P state.

When transiting to a writing sequence P2 shown in FIG. 19, the value of M is decremented by 1, DEC1 is reset, and DecSet is set, as shown in FIG. 14. In the writing sequence P2 shown in FIG. 19, therefore, M=0, DEC1=0, DEC2=1. According the transition diagrams shown in FIGS. 14 and 15, the B state is looped until the value of M becomes 1. In this case, since the value of M is 1 from the outset, the state transits alternately between the B and P states. If the condition of "N=0 and M=0" is satisfied when transiting to the P state (e.g., a writing sequence P3 shown in FIG. 19), the GOP is initialized by initializing N when transiting to the B state.

DEC2 is used as a condition to determine a decrease in the number of repeated B pictures in order to limit the unit by which to decrease the number of repeated B pictures between I or P pictures to 1. Since no mode of reducing the number of repeated B pictures is carried out unless M is 2 or more, as can be seen from FIG. 19, if DecSet is 1, the reading sequence is in the B state. Consequently, DecSet is monitored in the B state in the transition diagrams of FIGS. 16 and 17 (READ).

In the example of FIG. 19, DecSet is set while in the reading sequence B3. In this case, since N=2, M=1, DecSet=1, the condition of "M≦1 and DecSet=1, N≠0" is satisfied, and a next state to transit to in FIGS. 16 and 17 is a P Dec state. When transiting to the P Dec state, the value of N and the value of M0 are decremented by 1, M is initialized, and DecSet is reset. While in this state, since it is the P state, the data of a P frame is read. At the same time, the data of a B frame is also read by outputting a discard flag. However, this data (B4) is not used, but discarded.

A next state to transit to from the P Dec state is unconditionally the B state, as can be seen from FIGS. 16 and 17. Subsequently, the state transits alternately between the B and P states. When the condition of "N=0 and M=0" is satisfied (e.g., a reading sequence B6 shown in FIG. 19), the state transits to the I state with next timing, initializing each GOP.

Operation upon a scene change will be described below. A scene change is monitored in the B state and the P state on the writing side. Since the detection of a scene change precedes the other processes by 2 frames, the scene change is processed 2 frames prior to a scene changing view.

Figure 20:
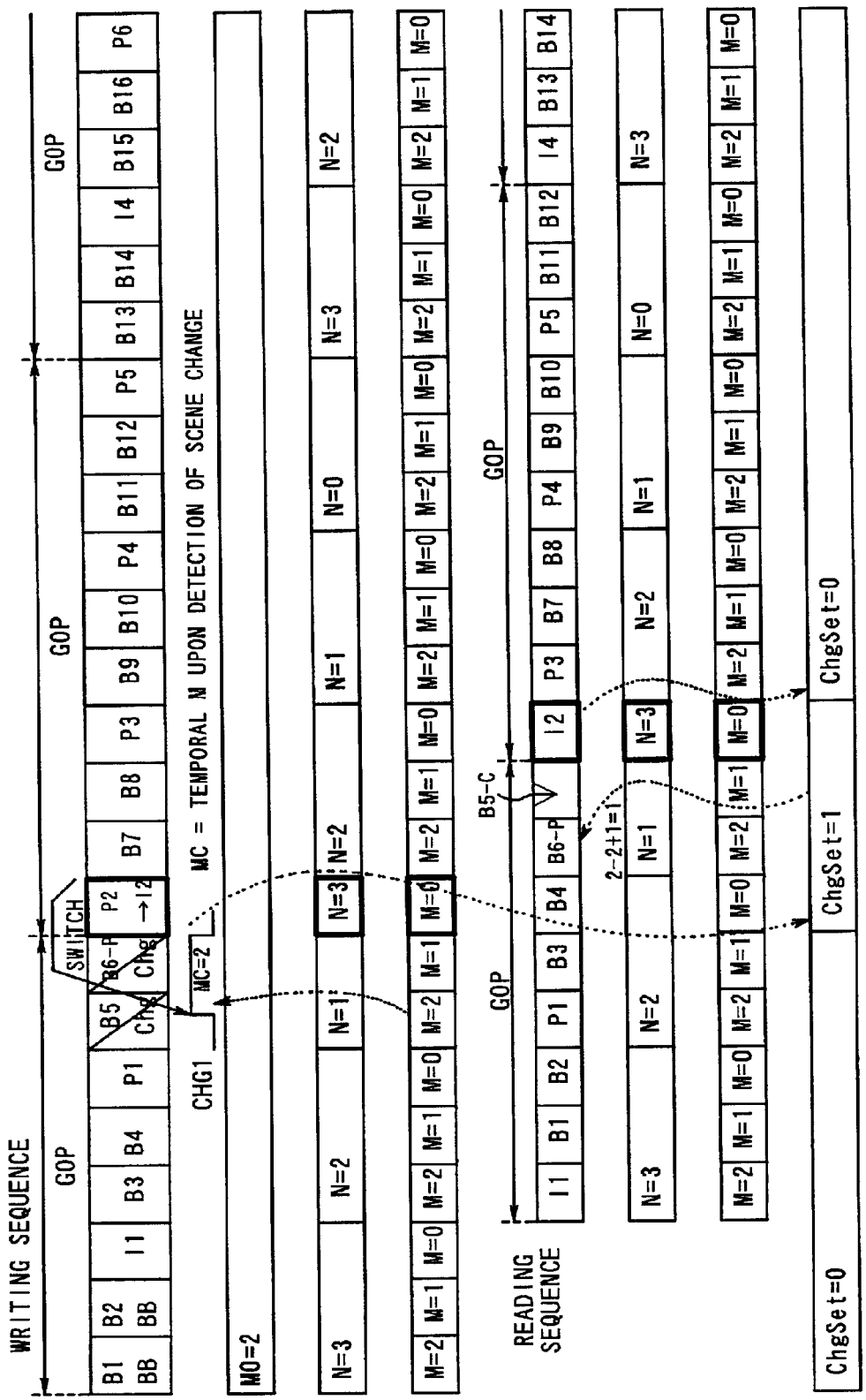
FIG. 20 is a diagram showing writing and reading sequences at the time a scene changes.

For example, if a scene change occurs at P2→I2 shown in FIG. 20, then the scene change is processed at B5, B6-P, and P2→I2. On the writing side, the value of M is held as MC, and the state is transited via the P state to the I state, forcibly setting the frame of the scene change to an I picture, and fixing a picture at the terminal end of the GOP on the writing side to P.

On the reading side, subsequent transitions are controlled according to a ChgSet flag and the value of MC in the P state. If ChgSet=1 and MC=0, then the state is transited to the I state, and thereafter to the P state, after which ordinary transitions are performed. If ChgSet=1 and MC≠0, then a B CHG state is transited M0+1−MC times, after which the state is transited to the I and P states, and thereafter ordinary transitions are performed.

Operation will be described below with reference to FIGS. 20 through 22. If a picture at a writing sequence P2→I2 shown in FIG. 20 is a scene change picture, then a scene change is detected at B5. In the B state shown in FIGS. 14 and 15, MC and CHG1 are set to MC=1 and CHG1=1. Since the condition of "(M=1 and N≠3" or CHG1=1") is satisfied in the B state shown in FIGS. 14 and 15, a next state to transit to is the P state (B6-P in FIG. 20). When entering this state, the value of M is decremented by 1, resulting in M=1.

Since the condition of "CHG1=1" is satisfied in the P state in FIGS. 14 and 15, a next state to transit to is the I state (P2→I2 in FIG. 20). When entering this state, CHG1, M, N are initialized, and a scene change detecting flag ChgSet on the reading side is set to 1.

A next state to transit to is unconditionally the B state, after which ordinary transitions are performed. On reading side, since operation starts with the number of repeated B pictures being 2, the state transits from I1→B1→B2→P1→B3→B4→P(B6-P). In the P state shown in FIGS. 16 and 17, since the condition of "ChgSet=1, MC≠0" is satisfied, a next state to transit to is a B CHG state (a reading sequence B5 shown in FIG. 21).

Figure 21:
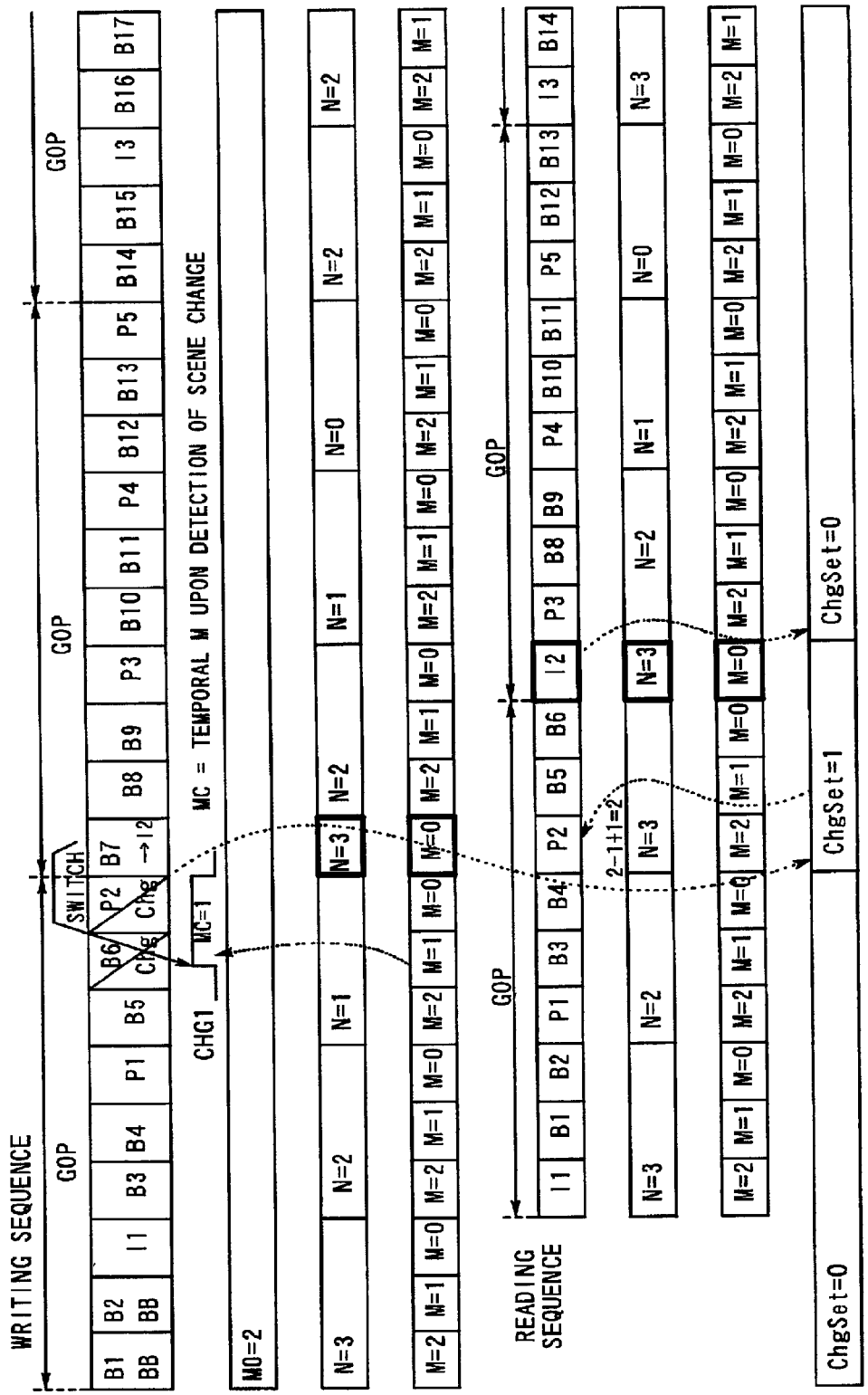
FIG. 21 is a diagram showing writing and reading sequences at the time a scene changes.

Since CNT=2-2-1=1, the condition of "CNT≦1" is satisfied, and a next state to transit to is an I CHG state (a reading sequence I2 shown in FIG. 21). At this time, N is initialized, and the state is unconditionally transited to the P state (a reading sequence P3 shown in FIG. 21) with next timing. When transiting to the P state, N is decremented, M is initialized, and ChgSet is reset, after which ordinary operation is performed.

Therefore, as shown in FIG. 20, it is possible to set a scene changing view to an I picture and inhibit a reference to a predicted value across; and over the scene changing view.

If a picture at a writing sequence B7→I2 shown in FIG. 21 is a scene change picture, then a scene change is detected at B6. Then, MC and CHG1 are set to MC=1 and CHG1=1 in the B state shown in FIGS. 14 and 15.

Since the condition of "(M=1 and N≠3" or CHG1=1") is satisfied in the B state shown in FIGS. 14 and 15, a next state to transit to is the P state (P2Chg in FIG. 21). When entering this state, the value of M is decremented by 1, resulting in M=0.

Since the condition of "CHG1=1" is satisfied in the P state in FIGS. 14 and 15, a next state to transit to is the I state (B7→I2 in FIG. 21). When entering this state, CHG1, M, N are initialized, and the scene change detecting flag ChgSet on the reading side is set to 1.

A next state to transit to is unconditionally the B state, after which ordinary transitions are performed. On reading side, since operation starts with the number of repeated B pictures being 2, the state transits from I1→B1→B2→P1→B3→B4→P2. In this state, since the condition of "ChgSet=1, MC≠0" is satisfied, a next state to transit to is the B CHG state (the reading sequence B5 shown in FIG. 21). Since CNT=2-1-1=2, the condition of "CNT>1" is satisfied, after the state transits to the B CHG state once again (a reading sequence B6 shown in FIG. 21), and thereafter to the I CHG state (the reading sequence I2 shown in FIG. 21).

At this time, N is initialized, and the state is unconditionally transited to the P state (the reading sequence P3 shown in FIG. 21) with next timing. When transiting to the P state, N is decremented, M is initialized, and ChgSet is reset, after which ordinary operation is performed. Therefore, as shown in FIG. 21, it is possible to set a scene changing view to an I picture and inhibit a reference to a predicted value across and over the scene changing view.

Figure 22:
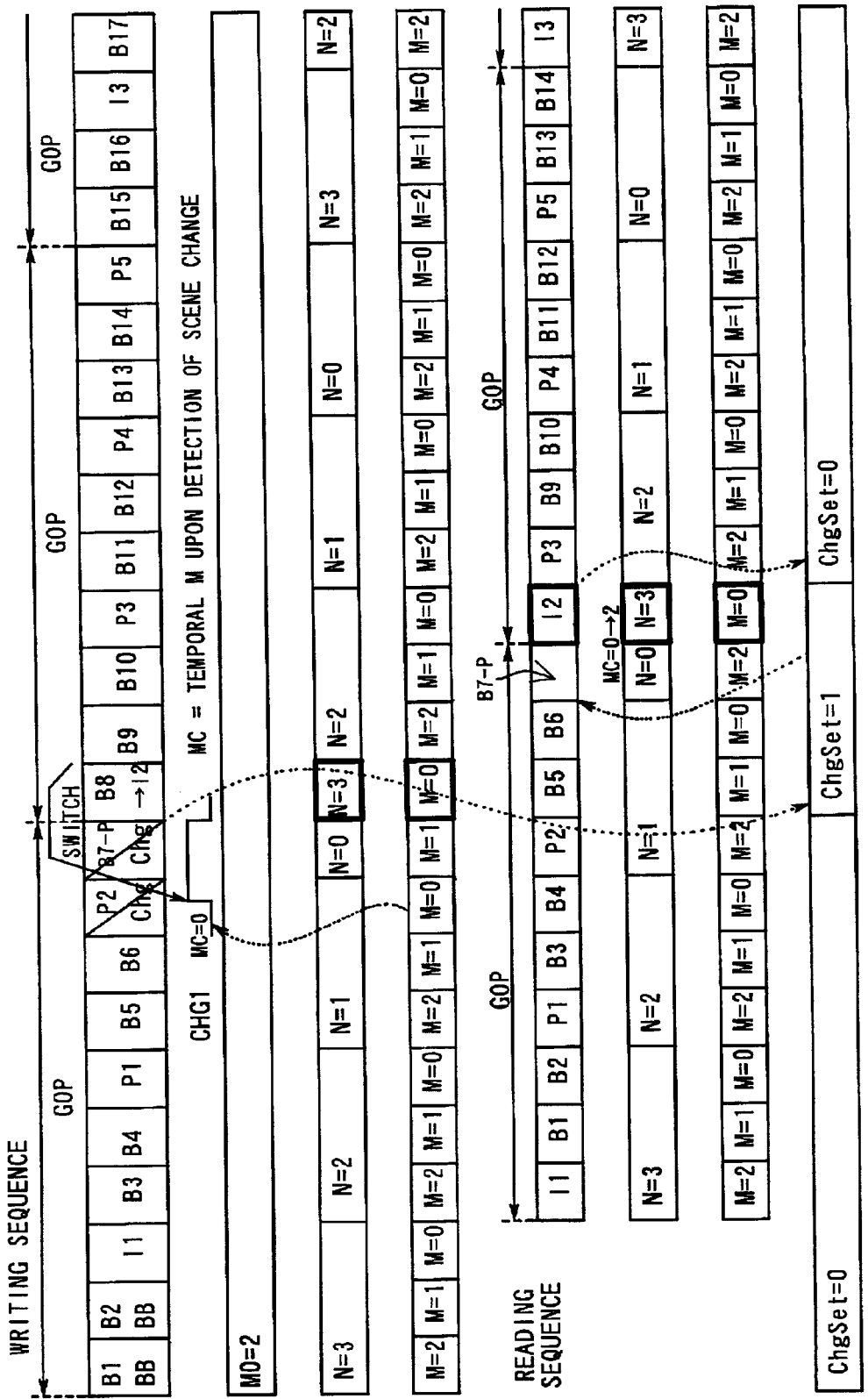
FIG. 22 is a diagram showing writing and reading sequences at the time a scene changes.

If a picture at a writing sequence B8→I2 shown in FIG. 22 is a scene change picture, then a scene change is detected at P2. Then, MC and CHG2 are set to MC=0 and CHG2=1 in the P state shown in FIGS. 14 and 15.

Since the condition of "CHG2=1" is satisfied in the P state shown in FIGS. 14 and 15, a next state to transit to is the P state (B7-P in FIG. 22). When returning to this state, CHG2 is reset and CHG1 is set, and hence a next state to transit to is an I state (B8→I2 in FIG. 22). When entering this sate, CHG1, M, N are initialized, and the scene change detecting flag ChgSet on the reading side is set to 1.

A next state to transit to is unconditionally the B state, after which ordinary transitions are performed. On reading side, since operation starts with the number of repeated B pictures being 2, the state transits from I1→B1→B2→P1→B3→B4→P2→B5→B6→B7-P.

In the P state shown in FIGS. 16 and 17, since the condition of "ChgSet=1, MC=0" is satisfied, a next state to transit to is a C CHG state (a reading sequence I2 shown in FIG. 22). At this time, N is initialized, and the state is unconditionally transited to the P state (the reading sequence P3 shown in FIG. 22) with next timing.

When transiting to the P state, N is decremented, M is initialized, and ChgSet is reset, after which ordinary operation is performed. Therefore, as shown in FIG. 22, it is possible to set a scene changing view to an I picture and inhibit a reference to a predicted value across and over the scene changing view.

According to the present invention, as described above, since it is possible to automatically converge to an optimum value representing the number of repeated B pictures from the magnitude of the motion vector, the MC predictive error, and the interframe difference, the coding efficiency and the image quality can be improved. When a scene change occurs, an I picture is inserted. Therefore, any increase in the amount of information caused by a scene change can be made smaller than with the conventional process the period of I pictures is fixed, so that the coding efficiency and the image quality can be improved.

As described above, the image control apparatus according to the present invention compares the motion vector with a threshold, the motion-compensated predictive error with a threshold, and the difference produced by subtracting the motion-compensated predictive error from the interframe difference with a threshold, and adaptively controls the number of repeated B pictures based on the compared results. Therefore, it is possible to achieve a coding control process suitable for the pattern and motion of an input image, for thereby improving the coding efficiency and the image quality.

Furthermore, the image control apparatus detects the occurrence of a scene change based on the interframe difference average, and inserts an I picture into a stream when a scene change is detected. Since the image control apparatus can perform a coding control process suitable for the pattern and motion of an input image, the coding efficiency and the image quality can be improved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An image control apparatus for controlling a process of coding an image signal, comprising:
    comparison processing means for carrying out at least one of a first comparison process to compare a motion vector with a threshold, a second comparison process to compare a motion-compensated predictive error with a threshold, and a third comparison process to compare a difference value produced by subtracting the motion-compensated predictive error from an interframe difference with a threshold; and
    repetitive number control means for adaptively controlling the number of repeated B pictures to be inserted into a stream based on the compared result of the comparison process which is carried out by said comparison processing means and increasing or decreasing the number of the B pictures in the stream during the process of coding the image signal.

2. An image control apparatus according to claim 1, wherein said repetitive number control means comprises means for increasing said number of repeated B pictures if said motion vector is determined as smaller than said threshold in said first comparison process, and decreasing said number of repeated B pictures if said motion vector is determined as greater than said threshold in said first comparison process.

3. An image control apparatus according to claim 1, wherein said repetitive number control means comprises means for increasing said number of repeated B pictures if said motion-compensated predictive error is smaller than said threshold, and decreasing said number of repeated B pictures if said motion-compensated predictive error is greater than said threshold.

4. An image control apparatus according to claim 1, wherein said repetitive number control means comprises means for increasing said number of repeated B pictures if said difference value is greater than said threshold, and decreasing said number of repeated B pictures if said difference value is smaller than said threshold.

5. An image control apparatus according to claim 1, wherein said repetitive number control means comprises means for relating the compared result of said first comparison process, the compared result of said second comparison process, and the compared result of said third comparison process to each other to increase, hold, or decrease said number of repeated B pictures.

6. An image control apparatus for controlling a process of coding an image signal, comprising:
    scene change detecting means for detecting the occurrence of a scene change based on an interframe difference average representing an average of interframe differences of one picture; and
    picture insertion control means for inserting an I picture into a stream during the process of coding the image signal if a scene change is detected by said scene change detecting means and inhibiting a reference to a predicted value across and over the I picture which is inserted as a scene changing view.

7. An image control apparatus according to claim 6, wherein said scene change detecting means comprises means for detecting the occurrence of a scene change if said interframe difference average is greater than a threshold.

8. An image control apparatus according to claim 6, wherein said scene change detecting means comprises means for detecting the occurrence of a scene change if the number of blocks in which the difference between a block average of pixel data in each of blocks converted from a picture and the interframe difference average is greater than a given value is greater than a predetermined number.

9. An image control apparatus according to claim 6, wherein said scene change detecting means comprises means for detecting the occurrence of a scene change if said interframe difference average is greater than a threshold and also if the number of blocks in which the difference between a block average of pixel data in each of blocks converted from a picture and the interframe difference average is greater than a given value is greater than a predetermined number.

10. An image control apparatus according to claim 6, wherein said scene change detecting means comprises means for detecting the occurrence of a scene change if a change in said interframe difference average is greater than a given value and represents an abrupt change.

11. An image control apparatus according to claim 6, wherein said scene change detecting means comprises means for detecting the occurrence of a scene change if said interframe difference average is lower than a threshold, and also a change in said interframe difference average is greater than a given value and represents an abrupt change.

12. An image control apparatus for controlling a process of coding an image signal, comprising:
    comparison processing means for carrying out at least one of a first comparison process to compare a motion vector with a threshold, a second comparison process to compare a motion-compensated predictive error with a threshold, and a third comparison process to compare a difference value produced by subtracting the motion-compensated predictive error from an interframe difference with a threshold;
    repetitive number control means for adaptively controlling the number of repeated B pictures to be inserted into a stream based on the compared result of the comparison process which is carried out by said comparison processing means, and increasing or decreasing the number of the B pictures in the stream during the process of coding the image signal;
    scene change detecting means for detecting the occurrence of a scene change based on an interframe difference average representing an average of interframe differences of one picture; and picture insertion control means for inserting an I picture into a stream during the process of coding the image signal if a scene change is detected by said scene change detecting means, and inhibiting a reference to a predicted value across and over the I picture which is inserted as a scene changing view.

* * * * *